(12) United States Patent
Solmaz et al.

(10) Patent No.: US 12,032,912 B2
(45) Date of Patent: Jul. 9, 2024

(54) SEMANTIC CONCEPT MATCHING USING ENHANCED WEAK SUPERVISION

(71) Applicant: NEC Laboratories Europe GmbH, Heidelberg (DE)

(72) Inventors: Gurkan Solmaz, Heidelberg (DE); Flavio Cirillo, Heidelberg (DE); Fabio Maresca, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 367 days.

(21) Appl. No.: 17/578,566

(22) Filed: Jan. 19, 2022

(65) Prior Publication Data

US 2023/0092447 A1 Mar. 23, 2023

Related U.S. Application Data

(60) Provisional application No. 63/241,146, filed on Sep. 7, 2021.

(51) Int. Cl.
*G06F 40/30* (2020.01)
*G06F 40/169* (2020.01)
*G06V 30/19* (2022.01)

(52) U.S. Cl.
CPC ............ *G06F 40/30* (2020.01); *G06F 40/169* (2020.01); *G06V 30/19093* (2022.01); *G06V 30/19147* (2022.01)

(58) Field of Classification Search
CPC . G06F 40/30; G06F 40/169; G06V 30/19147; G06V 30/1093
See application file for complete search history.

(56) References Cited

U.S. PATENT DOCUMENTS

| 11,544,471 | B2 * | 1/2023 | Belém | G06Q 40/02 |
| 2008/0201280 | A1 | 8/2008 | Martin et al. | |
| 2010/0198837 | A1 | 8/2010 | Wu et al. | |
| 2021/0201076 | A1 | 7/2021 | Cheng et al. | |

FOREIGN PATENT DOCUMENTS

KR  20110139681 A  12/2011

OTHER PUBLICATIONS

Lison, skweak: Weak Supervision Made Easy for NLP, 2021, arXiv, whole document (Year: 2021).*
Thieblin, et al., "Survey on Complex Ontology Matching," *Semantic Web* 11, 4, pp. 689-727, Aug. 7, 2020, IOS Press, Amsterdam, Netherlands.

(Continued)

*Primary Examiner* — Sonia L Gay
(74) *Attorney, Agent, or Firm* — Leydig, Voit & Mayer, Ltd.

(57) ABSTRACT

A method augments data labels of a machine learning task. The method includes applying at least one labeling function for each of a plurality of pairs of semantic concepts and producing a labeling matrix, computing pairwise similarity scores using similarity metrics for each of the pairs of semantic concepts, augmenting the labeling matrix using the pairwise similarity scores to increase a density of the labeling matrix, and inputting the labeling matrix to a label aggregator to apply a single label for each of the pairs of semantic concepts labeled by the at least one labeling function.

15 Claims, 19 Drawing Sheets

(56) References Cited

OTHER PUBLICATIONS

Ratner, et al., "Data Programming: Creating Large Training Sets, Quickly," *Advances in Neural Information Processing Systems 29*, pp. 3567-3575, Dec. 3, 2016, NeurIPS, Barcelona, Spain.
Ratner, et al., "Snorkel: Rapid Training Data Creation with Weak Supervision," *Proceedings of the VLDB* Endowment 11, 3, pp. 1-17, Nov. 28, 2017, VLDB Endowment Inc., Los Angeles, Ca, USA.
Takeoka, et al., "Learning with Unsure Responses," *The Thirty-Fourth AAAI Conference on Artificial Intelligence*, pp. 230-238, Feb. 7-12, 2020, Association for the Advancement of Artificial Intelligence, Menlo Park, CA, USA.
Biegel, et al., "Active WeaSuL: Improving Weak Supervision with Active Learning," *Ninth International Conference on Learning Representations*, pp. 1-13, Apr. 30, 2021, ICLR, Vienna, Austria.
Nashaat, et al., "Hybridization of Active Learning and Data Programming for Labeling Large Industrial Datasets," *IEEE International Conference on Big Data*, pp. 46-55, Dec. 10-13, 2018, Institute of Electrical and Electronics Engineers, Piscataway, NJ, USA.

\* cited by examiner

Input: $D$: Data matrix containing for each row the combination of two concepts with their features; metrics = $[S_1(x,y), ..., S_m(x,y)]$

Output: $distance\_matrix$: the final distances between all data points are stored here. They are used as metric of similarity.

1   $similarities \leftarrow \{\}$
2   $distance\_matrix \leftarrow 0 * n \times n$
3
4   *# apply similarity metrics*
5   for $S_j \in metrics$ do
6      $similarities_j \leftarrow \{\}$
7      for $x^{(i)} \in D$ do
8          $similarity \leftarrow S_j(x^{(i)})$
9          $similarities_j \leftarrow similarities_j \cup similarity$
10      end
11      $similarities \leftarrow similarities \cup similarities_j$
12   end
13
14   *# normalize per metric*
15   for $similarities_j \in similarities$ do
16      $similarities_j \leftarrow normalize(similarities_j)$
17      *# append the column of similarities to D*
18      $D \leftarrow D \cup similarities_j$
19   end
20
21   *# compute similarity of similarities*
22   for $x^{(i)} \in D$ do
23      for $x^{(k)} \in D$ do
24          for each metric $j$ do
25              $d \leftarrow abs(similarities_j[i] - similarities_j[k])$
26              $distance \leftarrow distance + d$
27          end
28          $distance\_matrix[i][k] \leftarrow distance$
29      end
30   end
31   return $distance\_matrix$

FIG. 16

| | LF name | LF description | Outcomes | Coverage | Overlaps | Conflicts |
|---|---|---|---|---|---|---|
| 1 | class_name_equal_conference | Check equality of concepts' names | {1} | 0.04 | 0.04 | 0.03 |
| 2 | class_name_split_equal | Check substring equality of concepts' names | {1} | 0.02 | 0.02 | 0.01 |
| 3 | class_name_split_spacy_distance | Threshold on spaCy distance | {0, 1} | 0.10 | 0.08 | 0.05 |
| 4 | class_name_split_stemmed_equal | Check substring equality on stemmed names | {1} | 0.02 | 0.02 | 0.01 |
| 5 | primary_text_equal | Check equality of extended concepts' names | {1} | 0.04 | 0.04 | 0.03 |
| 6 | primary_text_levenshtein_distance | Threshold on Levenshtein distance of extended concepts' names | {0, 1} | 0.65 | 0.16 | 0.34 |
| 7 | primary_text_use_distance | Threshold on use distance of extended concepts' names | {0, 1} | 0.17 | 0.11 | 0.08 |
| 8 | primary_text_synonyms | Threshold on common synonyms count | {1} | 0.03 | 0.03 | 0.02 |
| 9 | superclasses_equal | Check superclass names of the two concepts | {1} | 0.04 | 0.04 | 0.03 |
| 10 | subclasses_equal | Check subclasses names of the two concepts | {1} | 0.04 | 0.04 | 0.03 |
| 11 | root_nouns | Check equality of roots of the two concepts' names | {1} | 0.04 | 0.04 | 0.03 |

FIG. 18

| Concept ID | Class prefix | Name | Primary text | Subclasses | Superclasses | ... |
|---|---|---|---|---|---|---|
| cmtmeta-reviewer | http://cmt/# | Meta-Reviewer | {'class_name': 'Meta-Reviewer', 'class_name_split': 'meta reviewer'} | [ ] | [('ConferenceMember',), ('User',), ('Person',), ('PCMember',)] | ... |
| lastedspeaker_lecture | http://lasted/# | Speaker_lecture | {'class_name': 'Speaker_lecture', 'class_name_split': 'speaker lecture'} | [ ] | [('Conference_activity',), ('Activity',)] | ... |
| cmtperson | http://cmt/# | Person | {'class_name': 'Person', 'class_name_split': 'person'} | [('ConferenceMember',), ('User',), ('PCMember',)] | [ ] | ... |
| confofperson | http://confof/# | Person | {'class_name': 'Person', 'class_name_split': 'person'} | [('Individual',), ('Someone',), ('Somebody',)] | [('Thing',)] | ... |

FIG. 19

SEMANTIC CONCEPT MATCHING USING ENHANCED WEAK SUPERVISION

CROSS-REFERENCE TO RELATED APPLICATION

Priority is claimed to U.S. Provisional Patent Application No. 63/241,146, filed on Sep. 7, 2021, the entire disclosure of which is hereby incorporated by reference herein.

FIELD

The present invention relates to artificial intelligence (AI) and machine learning (ML), and in particular to a method, system, and computer-readable medium for semantic concept matching using weak supervision (WS).

BACKGROUND

Ontology matching is one of the key problems for creating knowledge databases by combining different data sources together through complex relationships between concepts in different ontologies. Complex ontology matching has recently gained more relevance due to availability of various open data ontologies (see, e.g., Shvaiko, et al., "Ontology matching: state of the art and future challenges," IEEE Transactions on Knowledge and Data Engineering, Institute of Electrical and Electronics Engineers, 25 (1), pp. 158-1'76, 10.1109/TKDE.2011.253, hal-00917910 (2013), which is hereby incorporated by reference herein). Similar to ontology matching, schema matching allows correlation of concepts such as objects from different distributed data sources.

SUMMARY

An embodiment of the present invention provides a method for augmenting data labels of a machine learning task. The method includes applying at least one labeling function for each of a plurality of pairs of semantic concepts and producing a labeling matrix, computing pairwise similarity scores using similarity metrics for each of the pairs of semantic concepts, augmenting the labeling matrix using the pairwise similarity scores to increase a density of the labeling matrix, and inputting the labeling matrix to a label aggregator to apply a single label for each of the pairs of semantic concepts labeled by the at least one labeling function.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 16 illustrates pseudo-code of an Algorithm 1 for determining final distances between data points that are used as metric of similarity according to an embodiment;

FIG. 18 provides further details of an embodiment's labeling function results used in a complete set scenario; and FIG. 19 provides examples of semantic concepts.

DETAILED DESCRIPTION

Figure 1:
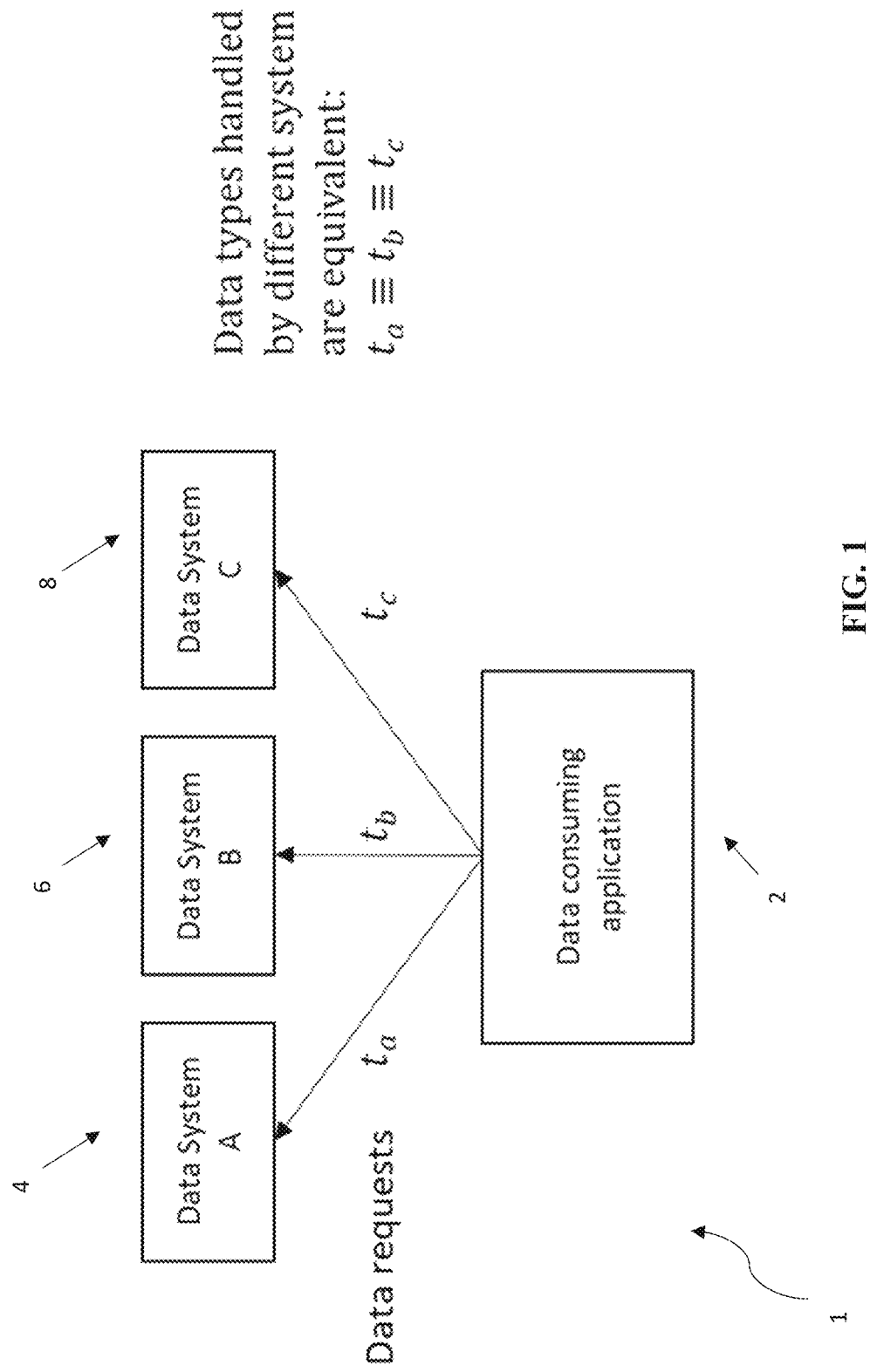
FIG. 1 illustrates an application consuming data from different data systems providing a same type of data t with different data models $t_a$, $t_b$, and $t_c$.

Ontology matching is used to homogenize data coming from heterogeneous sources to reduce the number of requests from a data consumer application. Further, a data consumer developer needs to know less data models. Embodiments of the present invention improve the function of ontology matching processes and formation of homogenized data layers, which in turn decreases the number of data requests an application must send in order to obtain the same information without a homogenized data layer. By augmenting a programmer's manual labeling of a data set, the accuracy and convergence of the process is greatly improved, and the burden on programmers to know and incorporate models and labels into an ontology matching procedure is reduced. Further, embodiments that augment labeling matrices impose reduced requirements on the number of labeling functions (LFs), data requests, computing capacity and resources, and units of time spent integrating and discovering data needed to be provided by a programmer or application. Moreover, embodiments provide a greater quantity of usable and available data in the form of non-abstained data points and, in certain applications, digital twin datasets and effective coordination of information queries.

Embodiments of the present invention provide a system, method and computer-readable medium for matching semantic concepts (e.g., ontology, schema, or entity matching) based on weak supervision. The system leverages the ontology or schema entity characteristics such as various attributes of ontology entity nodes or relationships and it is based on programmatic labeling. The method is based on the similarity of similarities between pairs of ontology or schema concepts as a novel way of reinforcing (augmenting) the existing programmatic labels in an improved manner. Reinforced labeling application to the ontology and schema matching leads to a need for fewer labeling rules, better generalization and more accurate predictions. The reduced labeling rules reduces computational complexity, thereby providing for increased computer processing power, faster computations and/or savings of computational resources, while at the same time providing the improved generalization and accuracy.

Embodiments of the present invention provide a system, method and computer-readable medium for semantic concept matching using enhanced weak supervision. The method according to an embodiment comprises the steps of computing noisy labels by applying labeling functions for each pair of semantic concepts producing a labeling matrix; computing similarities using similarity metrics for each pair of concepts; preferably aggregating the similarities between two pairs of concepts to compute a single similarity score for each couple of pairs of concepts; augmenting labels using the similarity score to increase the density of the matrix of noisy labels; applying a label aggregator to decide on a single label per pair of concepts; training a discriminative machine learning model or end model; and using the trained discriminative model for matching semantic concepts.

The system according to an embodiment of the present invention comprises one or more hardware processors having access to physical memory which configures the processors to be able execute a method according to an embodiment of the present invention.

The computer-readable medium according to an embodiment of the present invention is tangible and non-transitory and contains computer-executable instructions which, upon being executed by one or more processors, facilitate execution of a method according to an embodiment of the present invention.

In various embodiments the semantic concept matching system leverages the similarity of semantic concept similarities for augmenting existing labels from labeling functions.

In various embodiments the semantic concept matching system utilizes a horizontal and vertical similarity of concept similarity computation using two semantic concept pairs, one of the semantic concept pairs being already labeled. The semantic concept matching system may transfer a label from one pair to another.

Aspect (1): In an aspect (1), the present invention provides a method for augmenting data labels of a machine learning task. The method includes applying at least one labeling function for each of a plurality of pairs of semantic concepts and producing a labeling matrix, computing pairwise similarity scores using similarity metrics for each of the pairs of semantic concepts, augmenting the labeling matrix using the pairwise similarity scores to increase a density of the labeling matrix, and inputting the labeling matrix to a label aggregator to apply a single label for each of the pairs of semantic concepts labeled by the at least one labeling function.

Aspect (2): In an aspect (2), the present invention provides the method according to the aspect (1), wherein the aspect further includes computing a set of similarity scores between the pairwise similarity scores for each of the pairs of semantic concepts, computing a single similarity score between each two pairs of semantic concepts, using the set of similarity scores respective to each of the pairs of semantic concepts, and projecting a label from a labeled one of the semantic pairs to an unlabeled one of the semantic pairs in a case that the single similarity score is above a predetermined threshold.

Aspect (3): In an aspect (3), the present invention provides the method according to the aspects (1) or (2), wherein the aspect further includes training a discriminative machine learning model with the labeling matrix.

Aspect (4): In an aspect (4), the present invention provides the method according to the aspects (1), (2), or (3), wherein the aspect further includes using a discriminative machine learning model that was trained with the labeling matrix to match semantic concepts.

Aspect (5): In an aspect (5), the present invention provides the method according to the aspects (1), (2), (3), or (4), wherein the pairs of semantic concepts comprise heterogeneous data sources of a geographical region and wherein the aspect further includes identifying a hazardous area.

Aspect (6): In an aspect (6), the present invention provides the method according to the aspects (1), (2), (3), (4), or (5), wherein the pairs of semantic concepts comprise data from independent parking spot providers, and wherein the aspect further includes producing a homogenized data layer comprising parking spot availability information.

Aspect (7): In an aspect (7), the present invention provides the method according to the aspects (1), (2), (3), (4), (5), or (6), wherein the pairs of semantic concepts comprise data from an existing geographic data source with known metadata, and wherein the aspect further includes, creating mapped data for a digital twin of a smart city, creating subsequent pairs of semantic concepts comprising new data sources, applying the at least one labeling function for the subsequent pairs of semantic concepts, and enriching the mapped data for the digital twin of the smart city using the subsequent pairs of semantic concepts.

Aspect (8): In an aspect (8), the present invention provides the method according to the aspects (1), (2), (3), (4), (5), (6), or (7), wherein the pairs of semantic concepts comprise data from heterogeneous data sources of energy consuming systems in an area, and wherein the aspect further includes producing a homogenized data layer queriable by an energy management application.

Aspect (9): In an aspect (9), the present invention provides the method according to the aspects (1), (2), (3), (4), (5), (6), (7), or (8), wherein at least two labeling functions label a single pair of the pairs of semantic concepts, the label aggregator aggregates all labels applied to the single pair of semantic concepts, and the single pair of semantic concepts is labeled with the label applied most frequently to the single pair of semantic concepts.

Aspect (10): In an aspect (10), the present invention provides the method according to the aspects (1), (2), (3), (4), (5), (6), (7), (8), or (9), wherein the at least one labeling function abstains from applying a label to a first pair of the semantic concepts, and applies a label to a second pair of the semantic concepts, and wherein the aspect further includes calculating a deterministic or probabilistic value using a distance between the first pair of semantic concepts and the second pair of semantic concepts, and labeling the first pair of semantic concepts using the deterministic or probabilistic value, based on the deterministic or probabilistic value being greater than a predetermined threshold.

Aspect (11): In an aspect (11), the present invention provides the method according to the aspects (1), (2), (3), (4), (5), (6), (7), (8), (9), or (10), wherein the set of similarity scores is a summation of a finite set of the pairwise similarities that is computable to a definite number.

Aspect (12): In an aspect (12), the present invention provides the method according to the aspects (1), (2), (3), (4), (5), (6), (7), (8), (9), (10), or (11), wherein the label aggregator creates a training dataset for training a discriminative machine learning model.

Aspect (13): In an aspect (13), the present invention provides the method according to the aspects (1), (2), (3), (4), (5), (6), (7), (8), (9), (10), (11), or (12), wherein the step of computing similarity scores using similarity metrics for each of the pairs of semantic concepts further comprises creating a first pair of semantic concepts from a first concept and a second concept, computing a first similarity score using the similarity metrics for the first pair of semantic concepts, creating a second pair of semantic concepts from a third concept and a fourth concept, and computing a second similarity score using the similarity metrics for the second pair of semantic concepts. The aspect also includes computing a third similarity score using the similarity metrics for the first concept of the first pair of semantic concepts and the third concept of the second pair of semantic concepts, and computing a fourth similarity score using the similarity metrics for the second concept of the first pair of semantic concepts and the fourth concept of the second pair of semantic concepts.

Aspect (14): In an aspect (14), the present invention provides a system for augmenting data labels of a machine learning task comprising one or more hardware processors which, alone or in combination, are configured to provide for execution of the following steps of applying at least one labeling function for each of a plurality of pairs of semantic concepts and producing a labeling matrix, computing pairwise similarity scores using similarity metrics for each of the pairs of semantic concepts, augmenting the labeling matrix using the pairwise similarity scores to increase a density of the labeling matrix, and inputting the labeling matrix to a label aggregator to apply a single label for each of the pairs of semantic concepts labeled by the at least one labeling function.

Aspect (15): In an aspect (15), the present invention provides for a tangible, non-transitory computer-readable medium having instructions thereon which, upon being executed by one or more hardware processors, alone or in combination, provide for execution of the following steps of applying at least one labeling function for each of a plurality of pairs of semantic concepts and producing a labeling matrix, computing pairwise similarity scores using similarity metrics for each of the pairs of semantic concepts, augmenting the labeling matrix using the pairwise similarity scores to increase a density of the labeling matrix, and inputting the labeling matrix to a label aggregator to apply a single label for each of the pairs of semantic concepts labeled by the at least one labeling function.

FIG. 1 shows the process 1 an application must perform without a homogenized data set when the data types handled by different systems are equivalent, i.e., $t_a \equiv t_b \equiv t_c$. In the absence of a homogenization layer, a data consuming application 2 (e.g., a dashboard) that aggregates data from multiple data systems, such as data system A 4, data system B 6, and data system C 8 that offer the same type of data t, needs to perform as many requests as the available data systems 4, 6, 8. This is true regardless of whether the data retrieved is of the same type. Ontology matching is used to homogenize data coming from heterogeneous sources to reduce the number of requests from the data consuming application 2. Further, a data consumer developer needs to know less data models.

Figure 2:
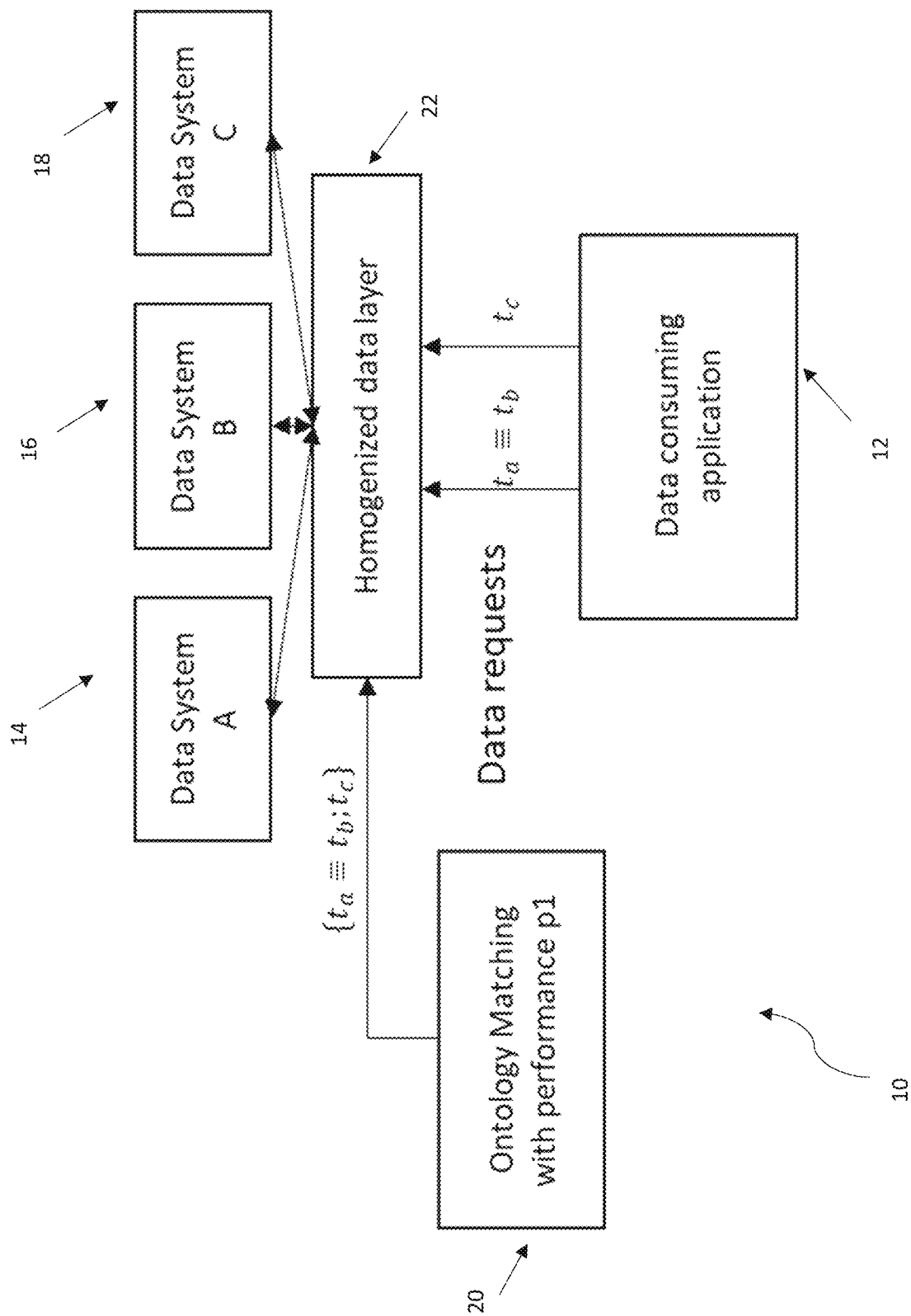
FIG. 2 illustrates an application consuming data from an imperfect homogenized data layer.

FIG. 2 shows the process 2 wherein an ontology matching component 20 is used to homogenize the data so that the data consuming application 12 does not have to send as many data requests. Ontology matching component 20 might generate code to be directly used by the homogenized layer 22 or it might just give a hint to a programmer on which mapping functions to write. In many cases an ontology matching is not perfect and it is capable to discover partial matches between equivalent classes. As a result, the data consuming application 12, in order to retrieve the needed data, will perform a reduced number of requests relative the case without the homogenized data layer 22, but not the minimal number of requests.

Embodiments of the present invention consider both ontology and schema matching scenarios where two concepts from different ontologies or schemas can be matched to each other. A concept can be an entity, attribute or relationship between entities. Similarly, concepts that do represent information about data, but do not belong to any ontology or schema, may be matched to another concept. On the other hand, ontologies and schemas contain additional information about the concept that may be useful in the matching process as inputs.

TABLE 1

| Concept ID | Class prefix | Name | Primary text | Subclasses | Superclasses |
|---|---|---|---|---|---|
| cmtmeta-reviewer | http://cmt/# | Meta-Reviewer | {\'class_name\': \'Meta-Reviewer\',\ 'class_name_split\': \'meta reviewer\'} | [ ] | [{\'ConferenceMember\'}, {\'User\'}, {\'Person\'}, {\'PCMember\'}] |
| iastedspeaker_lecture | http://iasted/# | Speaker_lecture | {'class_name': 'Speaker_lecture', 'class_name_split': 'speaker lecture'} | [ ] | [{\'Conference_activity\'}, {\'Activity\'}] |

TABLE 1-continued

| Concept ID | Class prefix | Name | Primary text | Subclasses | Superclasses |
|---|---|---|---|---|---|
| cmtperson | http://cmt/# | Person | {'class_name': 'Person', 'class_name_split': 'person'} | [{\'ConferenceMember\'}, {\'User\'}, {\'PCMember\'}] | [ ] |
| Confofperson | http://confof/# | Person | {'class_name': 'Person', 'class_name_split': 'person'} | [{\'Individual\'}, {\'Someone\'}, {\'Somebody\'}] | [{\'Thing\'}] |

Table 1, also shown in FIG. 19, includes some simple examples of semantic concepts. These examples are derived from three ontologies for conferences, namely, confof, cmt, and iasted. Table 1 includes a simplified version of the concepts to describe the semantic concept matching problem, whereas in practice many attributes exist to define the semantic concept. In these examples, a good semantic concept matching system would correlate confofperson and cmtperson (examples in the third and fourth row) and match these two concepts to each other. The system would not match any other possible concept pairs as they differ from each other. For different purposes, the matching can be relaxed and considered for similar semantic concepts even when there is no direct match. For simplicity purpose, only direct matches are considered. Although these example concepts show only a simple matching, in practice matching semantic concepts with each other might be much less straight-forward due to not matching names and considering many ontologies and languages, as well as semantic data models.

For semantic concept matching, programmatic labeling as in the data programming is described by Ratner, et. al., "Data Programming: Creating Large Training Sets, Quickly," Adv. Neural Inf. Process Syst., 29, 3567 (2016) (hereinafter Ratner), which is hereby incorporated by reference herein, and is considered as state-of-the-art, where additional inputs for the system given by programmatic annotators can be used for training through weak supervision. In weak supervision, systems such as that described in Ratner, et al., "Snorkel: Rapid training data creation with weak supervision," Proceedings of the VLDB Endowment, International Conference on Very Large Data Bases. Vol. 11. No. 3. NIH Public Access (2017) (hereinafter Snorkel), which is hereby incorporated by reference herein, can be used to provide an application programming interface (API) for the application developers. The developers can enter the labeling functions and can use internal logic to annotate the data points. Labeling functions can be considered as heuristics or simple rules for weak supervision. Labeling function outputs are not considered as ground-truth as each labeling function is considered to be noisy and sparse considering the given task in terms of the data and real labels. Learning from noisy sources is considered in various contexts in machine learning including image/video classification tasks (see Takeoka, et al., "Learning with Unsure Responses," Proceedings of the AAAI Conference on Artificial Intelligence, 34, 230 (2020), which is hereby incorporated by reference herein). Furthermore, various improvements to the weak supervision exist such as using a small subset of hand-labeled ground-truth (see Biegel, et al., "Active WeaSuL: Improving Weak Supervision with Active Learning," conference paper, International Conference on Learning Representations, 9 (2021), which is hereby incorporated by reference herein) or weak supervision for large industrial datasets (see Mona et al., "Hybridization of active learning and data programming for labeling large industrial datasets," IEEE International Conference on Big Data (Big Data), 46 (2018), which is hereby incorporated by reference herein).

Figure 3:
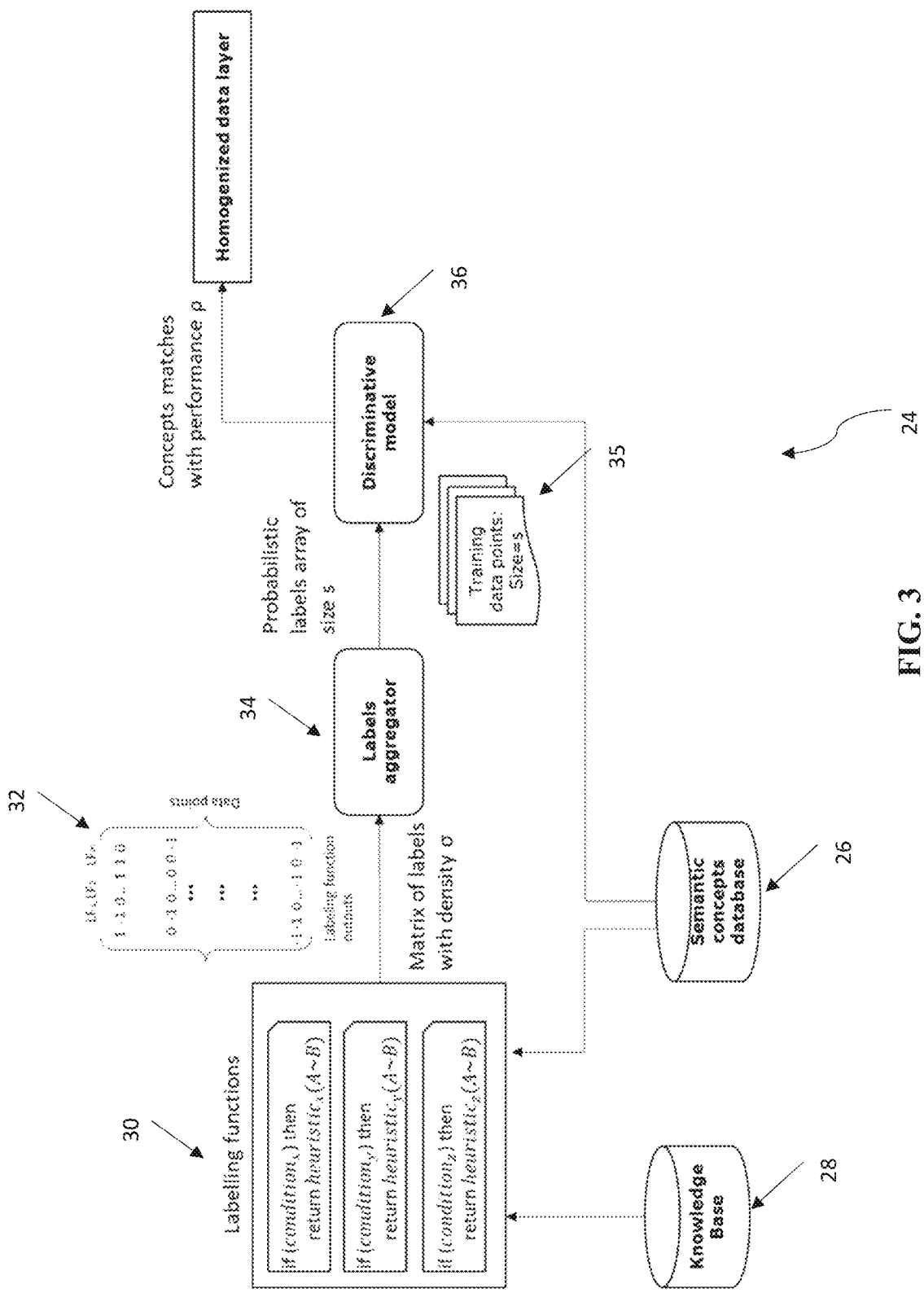
FIG. 3 illustrates a weak supervision system based on data programming for ontology matching.

FIG. 3 illustrates the pipeline 24 for the existing weak supervision based on a data programming system applied to the ontology, schema, or entity matching problems. A semantics concept database 26 contains semantic concepts that need to be matched with each other. This database contains the collection of concepts available at the different data systems 14, 16, 18 (see FIG. 2). A knowledge base 28 provides labeling functions 30 that are used to compare the concepts with each other. The labeling functions 30 are then applied to the semantic concepts database 26 and a matrix of noisy labels 32 as data points is generated. Afterward, a labels aggregator 34 processes the labeling matrix 32 in order to decide one single probabilistic label per data point previously annotated by one or multiple labeling functions 30. The labels aggregator 34 does not decide for data points not labeled by any labeling functions 30. As a result, a new training data set 35 is created with size s. The training data points 35 are used to train an end model (discriminative model) 36. For the discriminative model 36, various off-the-shelf and advanced machine learning algorithms are considered. Lastly, the discriminative model 36 is used to predict matches or non-matches considering the matching of various concepts with each other.

Applying data programming to ontology matching avoids the necessity of having expensive hand labels. However, state of the art approaches of existing computer systems have the following technical limitations: 1) needing to write many labeling functions; 2) low coverage of labeling functions compared to the complete dataset; and 3) low accuracy as a result of sparsity of labels.

Embodiments of the present invention overcome the aforementioned technical limitations of existing computer systems and provide a solution that improves the performance of ontology matching modules to increase the homogenization of data and thereby reduce the number of request messages needed by data consuming applications.

The proposed system pipeline according to an embodiment of the present invention enables augmenting the labeling functions' outputs with the approach based on similarity of similarities of the ontology or schema concepts.

Figure 4:
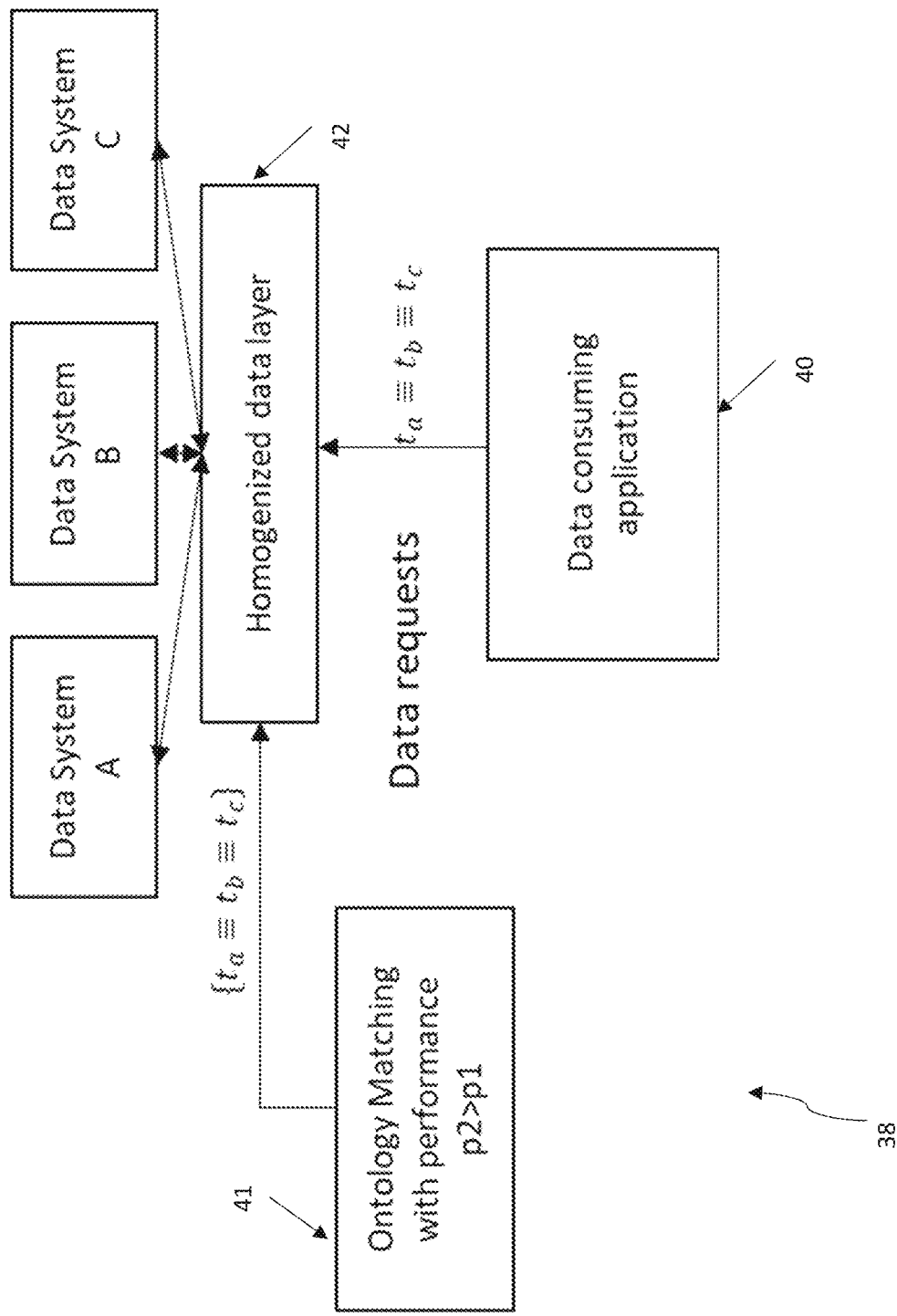
FIG. 4 illustrates an application consuming data from a perfect homogenized data layer.

FIG. 4 illustrates that a process 38 with a perfect homogenized data layer 42 reduces the number of needed requests for a data consuming application 40. Exemplary embodiments of the present invention improve the performance of the ontology matching component to minimize the number of data requests.

Figure 5:
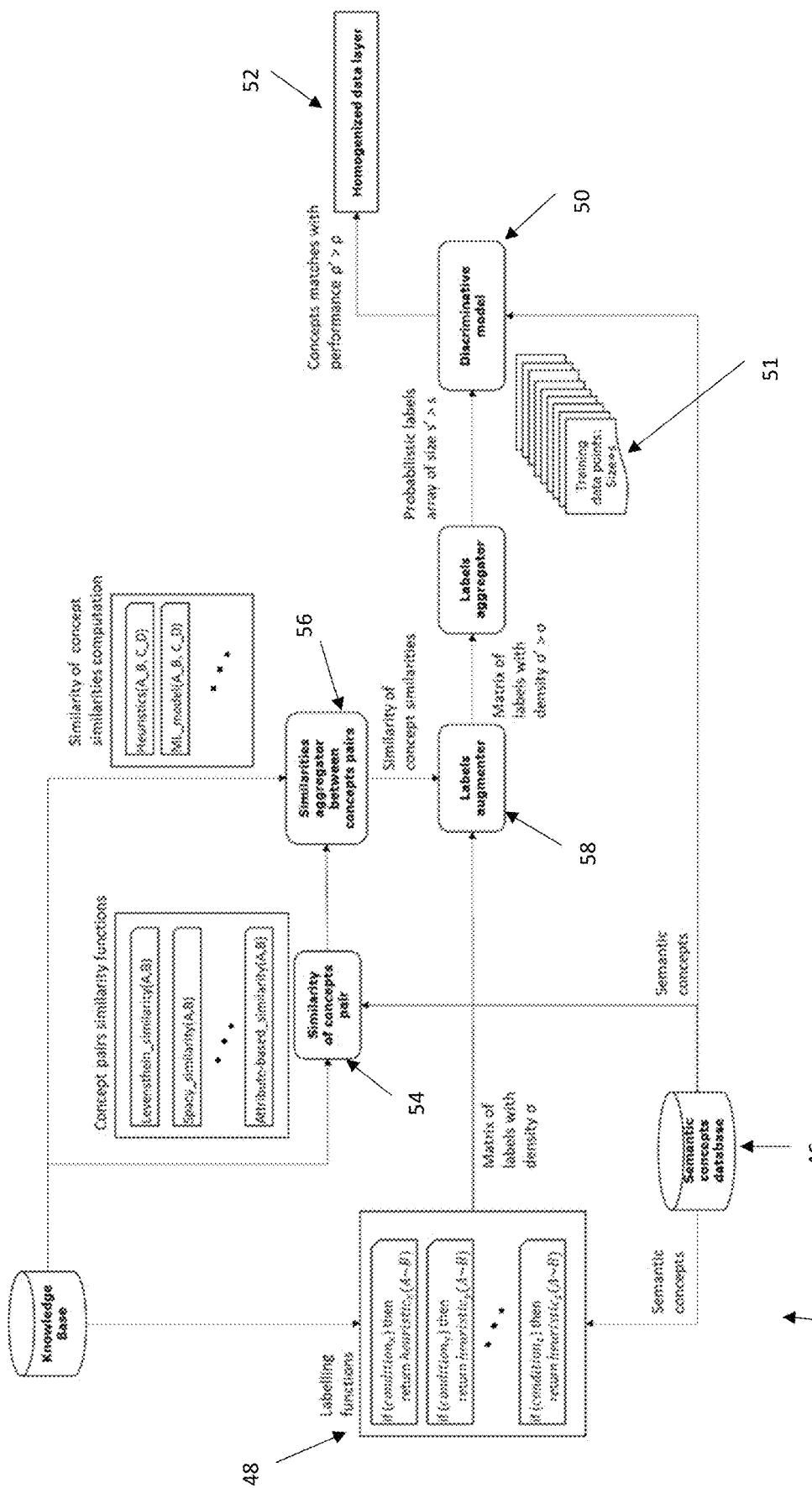
FIG. 5 illustrates an ML system for concept matching through weak supervision according to an embodiment of the present invention.

FIG. 5 illustrates an embodiment of the present invention that provides a new ML system 44 using a new approach that is different from the existing computer systems in the art for semantic concept matching. The semantic concepts are available from the semantics concepts database 46. In some embodiments, the semantic concepts database 46 contains known ontologies or schema of the data systems homogenized by the homogenized data layer. In other embodiments, the semantics concepts database 46 collects the concepts available directly by exploring the data systems homogenized by the homogenized data layer 52 (e.g., intercepting their data messages, or using the data systems API). FIG. 5 illustrates the system overview of the new ML system. The system leverages semantic concepts database 46 and weak supervision and programmatic labelling functions 48 for training as in the case of the existing system. Also, it is able to feed the discriminative model 50 with more data points, where the case s'≥s always holds considering s', s as the training data 51 sizes for the proposed invention and the state-of-the-art system. Thus, among the technological improvements provided by embodiments of the present invention, the system enables a reduced required number of programming labeling functions 48, higher probability of convergence, and higher end accuracy ρ'>ρ. Better performance of the discriminative model 50 translates to a better homogenized data layer 52, and, thus, less data requests needed for dataset collection by a data consumer.

Further technological improvement and advantages result due to the three components for semantic concepts matching as discussed in the following.

Similarity of concepts pair component 54: This component applies multiple similarity metric functions to each possible pair of concepts. The output is an array of similarity metrics, e.g., pairwise similarities, per pair of concepts. For example, given concept pair of concepts (x,y), this component will issue an array $(S_1(x,y), S_2(x,y), \ldots, S_m(x,y))$ Similarities aggregator between concepts pairs 56: This component computes a similarity between concepts pairs. In exemplary embodiments, this component computes an aggregated similarity between concept pairs, but aggregation is only one of various possible options. In other words, given two pairs of concepts (x,y) and (z,t) this component computes an overall similarity score $\zeta((x,y),(z,t))$, which can be applied to two pairs of concepts as a function and can be computed as a number: $\zeta((x,y),(z,t))=s; s\in R$.

Labels augmenter 58: This component increases the density σ of the labeling matrix to σ' using the score $\varepsilon((x,y),(z,t))$ as a distance index between two pairs of concepts.

The similarity of concepts pair component 54 is newly developed and implemented for the semantic concept matching application. The main logic of this model is to leverage "similarity of similarities" between multiple semantic concept pairs.

Figure 6:
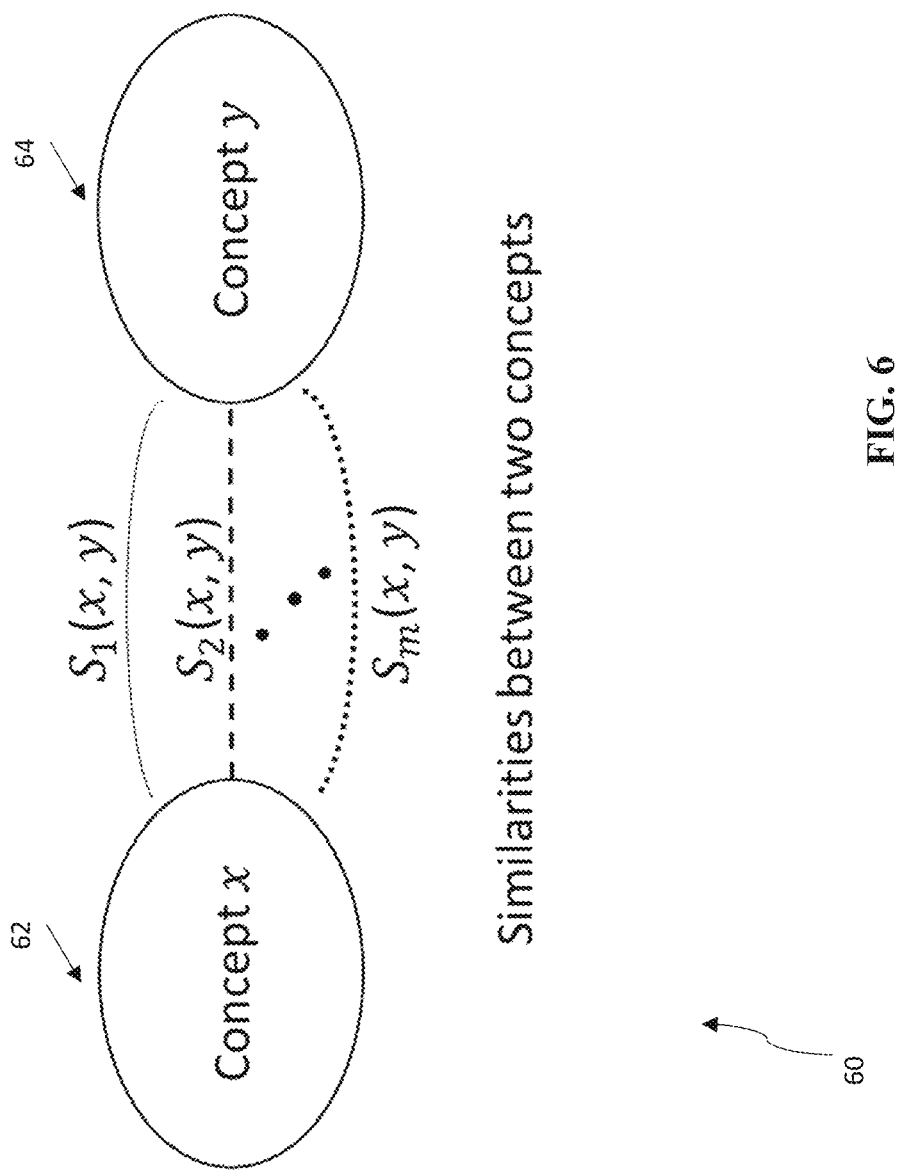
FIG. 6 illustrates a matching of two ontology concepts with each other using a number of different similarity metrics.

FIG. 6 helps to explain this new similarity of concepts pair model 60. FIG. 6 contains a simple illustration of how two semantic concepts Concept x 62 and Concept y 64 can be related to each other. As an example of the Concept x 62 and Concept y 64, any concept pair from table 1 can be considered. The concept pair of the two concepts $S_1(x,y)$ is a function that defines the first similarity function between Concept x 62 and Concept y 64. $S_1(x,y)$, the pairwise similarity, can be either a simple distancing function between the concept names or more complex similarity functions such as correlating various attributes of the semantic concept pair with each other (e.g., subclasses, superclasses). In some embodiments, each concept might be represented as a graph of information, and, thus, the similarity functions would compute a similarity score between graphs. In an embodiment, the present invention considers not only one similarity function but a finite set of similarity scores and functions $\{S_1(x,y), S_2(x,y), \ldots S_m(x,y)\}$ that define the relation between these two concepts. Having many similarity functions would be helpful in solving the complex matching problem. Although in the similarity of concepts pair model 60 of FIG. 6 only one pair is included, the similarity functions are applied to all concept pairs. FIG. 6 shows different styles in the match as each function has a different metric for defining the similarity relation between the concepts.

The similarities defined in FIG. 6 are used to perform the complex ontology matching in the existing computer systems. For the case of data programming in Ratner, labeling functions can be written by the ontology domain experts and these labeling functions can output 1 for the matching case, 0 for the non-matching case, or they may return −1 for the case of abstain. In practice, the labeling functions may abstain in most of the cases, especially for the more complex semantic concept matchings. The outputs of the labeling functions are gathered together to generate a "labeling matrix," as shown in the exemplary embodiments as data points 32 of FIG. 3 and the output of labels augmenter 58 of FIG. 5.

Figure 7:
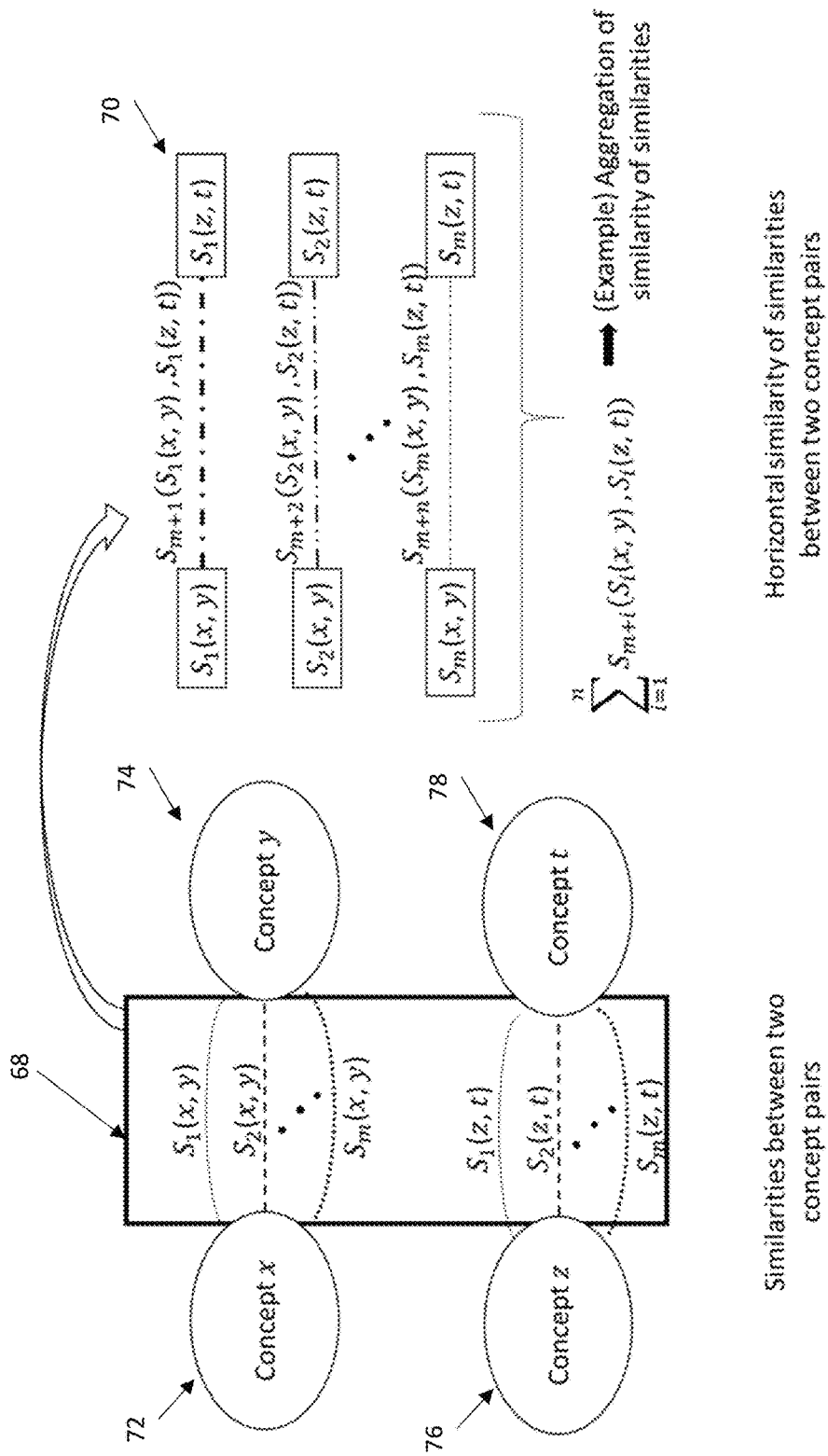
FIG. 7 illustrates a computing of horizontal similarity of similarities between two concept pairs (x-y, z-t) to apply reinforced labeling.

Embodiments of the present invention consider enhancing the labeling through exploring the similarity of similarities between semantic concept pairs 66 as shown in FIG. 7, and aggregate the similarities between concept pairs. A number of new similarity metrics (from m+1 to m+n) are provided as the similarity of similarities. On the left side of FIG. 7, the two concept pairs, Concept x 72-Concept y 74 and Concept z 76-Concept t 78 are related to each other as in FIG. 6 using the same similarity relations 68 function set $\{S_1(x,y), S_2(x,y), \ldots S_m(x,y)\}$ and $\{S_1(z,t), S_2(z,t), \ldots S_m(z,t)\}$. These pairs can be any arbitrary concept pairs and some of the pairs may or may not include the same concepts (e.g., Concept x=Concept t). In other words, there is no restriction on the selection of the concept pairs, except that each pair has two different concepts. After having these relations, the new system compares the similarity relations 68 with each other through a new set of similarity relations 70 functions:

$$\{S_{m+1}(S_1(x,y),S_1(z,t)),S_{m+2}(S_2(x,y),S_2(z,t)), \ldots S_{m+n}(x,y)\}$$

which compares the existing similarities and explores if the similarities have similar characteristics.

The similarity of similarities can be computed in different ways (as illustrated in the similarity of concept similarity computation in FIG. 5). One way can be using heuristic algorithms. A heuristic algorithm example is given in FIG. 7. The example heuristic is based on simply aggregating the similarity of similarities between the similarity of two pairs of semantic concepts:

$$\varsigma = \sum_{i=1}^{n} S_{m+i}(S_i(x, y), S_i(z, t))$$

More advanced heuristics can use weighting the similarity of similarities based on their importance as follows:

$$\varsigma = \sum_{i=1}^{n} w_i S_{m+i}(S_i(x, y), S_i(z, t))$$

Various ML models can be considered for adjusting the weights $w_i$ for every similarity of similarity function.

The intuitive logic behind exploring the similarity of similarities lies in the fact that if two concept pairs Concept x-Concept y and Concept z-Concept t have very similar relations, a particular labeling function may label the semantic concept matching as True|Concept x-Concept y, where as it may not be able to label the other one, in other words it may output Abstain|Concept z-Concept t. Similarly, the concept matching for False|Concept x-Concept y can be applied to the abstain case.

FIG. 7 shows one way that an embodiment of the present invention can also enhance the labeling through exploring the horizontal similarity of similarities between semantic concept pairs. The main difference of FIG. 8 and the previous FIG. 7 is the exploration from the vertical aspect instead of solely the horizontal aspect by the additional use of similarity relations 82 function set $\{S_1(x,z), S_2(x,z), \ldots S_m(x,z)\}$ and $\{S_1(y,t), S_2(y,t), \ldots S_m(y,t)\}$. The horizontal aspect was considering the similarity of similarities between two concept pairs. The vertical aspect considers the cross-cutting between the horizontal concept pairs as show on the right side of FIG. 8. The basic idea is as follows. If Concept x 84 and Concept z 90 are similar to each other, and if Concept y 86 and Concept t 88 are similar to each other, the matching between Concept x 84 and Concept y 86 can be applied to Concept z 90 and Concept t 88 or vice versa. So, for example, where two concept pairs Concept x-Concept y and Concept z-Concept t have very similar relations, a particular labeling function that labels the semantic concept matching as True|Concept x-Concept y, and outputs Abstain|Concept z-Concept t, can use vertical concept matching to apply the True label to|Concept z-Concept t to output True|Concept z-Concept t.

Figure 8:
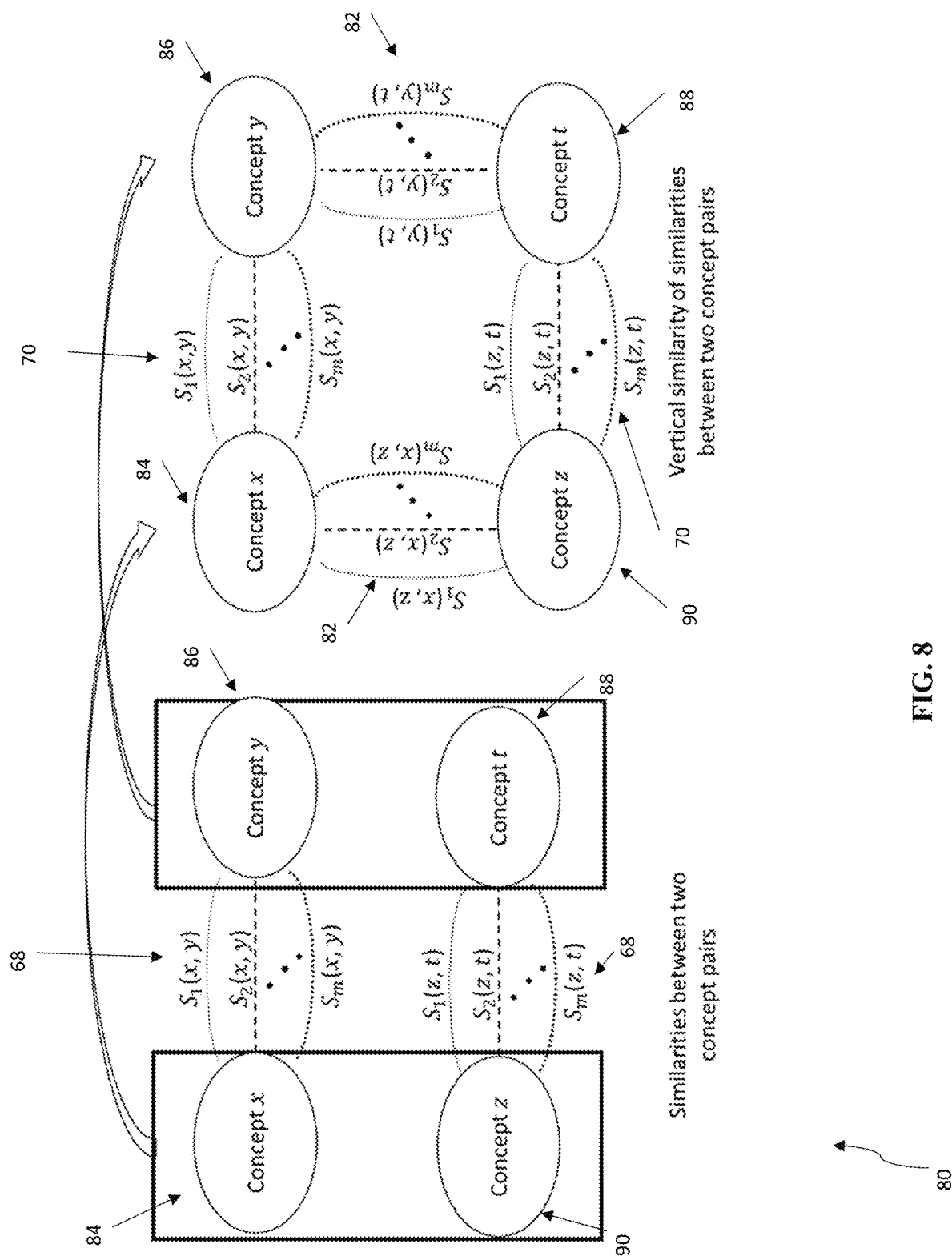
FIG. 8 illustrates a computing of vertical similarity of similarities between two concept pairs (x-y, z-t) using similarities of x-z and y-t to apply reinforced labeling.

On the left side of FIG. 8, the two concept pairs, Concept x 84-Concept y 86 and Concept z 90-Concept t 88 are related to each other as in FIG. 7 using the same similarity relations 68 function set $\{S_1(x,y), S_2(x,y), \ldots S_m(x,y)\}$ and $\{S_1(z,t), S_2(z,t), \ldots S_m(z,t)\}$. These pairs can be any arbitrary concept pairs and some of the pairs may or may not include the same concepts (e.g., Concept x 84=Concept t 88). In other words, there is no restriction on the selection of the concept pairs, except that each pair has two different concepts. After having these relations, the system compares the similarity relations with each other through the existing (or new) set of similarity relations 70 functions. These similarities can be combined through the similarity of concept similarity computation.

The result of the similarity of concept similarity computation is used for label augmentation. To decide if the computed similarities of concept similarity is above a certain threshold, since the two concept pairs have a match, the matching from one concept pair can be applied to the other concept pair as well. Although a simple decision approach using thresholds is provided as example, one can create dynamic thresholds or more advanced models for labeling decision making. For example, a threshold can be given by a data scientist, or computed automatically using a similarity score distribution for the specific dataset at issue (such as InterQuartileRange and outliers detection). In an embodiment of the present invention, the "label augmenter" proposed uses the generative weak supervision (GenWS) model that automatically augments the labels of each labeling function given the similarity metrics and the existing labeling function outputs. As the label augmenter helps make the label augmentation automatically, a similar component is included in the system as labels augmenter 58 in FIG. 5.

The label augmentation makes the computation as follows: For every data point that is abstained by a certain labeling function, it will have a corresponding value that refers to the unknown/abstain case in the initial labeling matrix, where each row represents a data point and each column represents a labeling function. For the abstain cases in the initial labeling matrix, the augmentation can be considered to exchange the corresponding value in labeling matrix (value that corresponds normally to an unknown/abstain case) with a value that is estimated using the other data points which were labeled (not unknown values) and have corresponding value in the matrix. For instance, if there is another data point that is labeled by a labeling function that is very similar to another data point that is not labeled by the same labeling function, the label on the labeled data point can be considered as a candidate label for other unlabeled data points, as the specific labeling function outcome. This method can be applied for all abstain cases in the labeling matrix to augment the existing labels and project to the unknown (abstain) cases.

For the case of semantic concept matching, each data point in the labeling matrix represents a concept pair, e.g., Concept x-Concept y, where each labeling matrix can label this data point (concept pair). For instance, a labeling function may return 1 when it predicts a match between Concept x-Concept y, 0 when it predicts a non-match between Concept x-Concept y, and finally −1 when it does not have any prediction regarding matching, which is the unknown/abstain case. If the labeling function returns −1, the same labeling function may return a 1 for another data point, representing concept pair Concept z-Concept t. If the new data point (representing Concept z-Concept t) is very similar to the previous data point (representing Concept x-Concept y), the label of the new data point Concept z-Concept t for the given labeling function can be used to label the data point Concept x-Concept y, even if the labeling function initially returned abstain for this data point. In an embodiment this similarity is defined through the similarity of similarities computation.

As a result of the similarity of concept similarity computation, new matchings (1s) or non-matchings (0s) between two semantic concepts are created that were previously unknown, as described above. This provides gains in the coverage and as a result improvements in the end accuracy of the ML system. The end accuracy gain is measured using the predictions of the discriminative end model through a small ground-truth dataset.

The proposed system and method according to embodiments of the present invention was implemented as a prototype and tested for various ontologies related to "conferences" events. A few example semantic concepts from these ontologies are shown in table 1. The preliminary results show substantial improvement in terms of using fewer labeling functions and providing higher accuracies in terms of F1 scores, recall (the ratio of true matches to true matches and false non-matches), and precision (the ratio between true matches and all matches). As the semantic concept matchings are supposed to happen not too frequently, the problem is similar to the family of anomaly detection problems. Due to this known bias, F1 scores provide a good understanding on the performance of the system. According to the preliminary analysis, the proposed method and system produced up to 12 points gain in the F1 scores compared to an existing model based on data programming described in Ratner.

Figure 9:
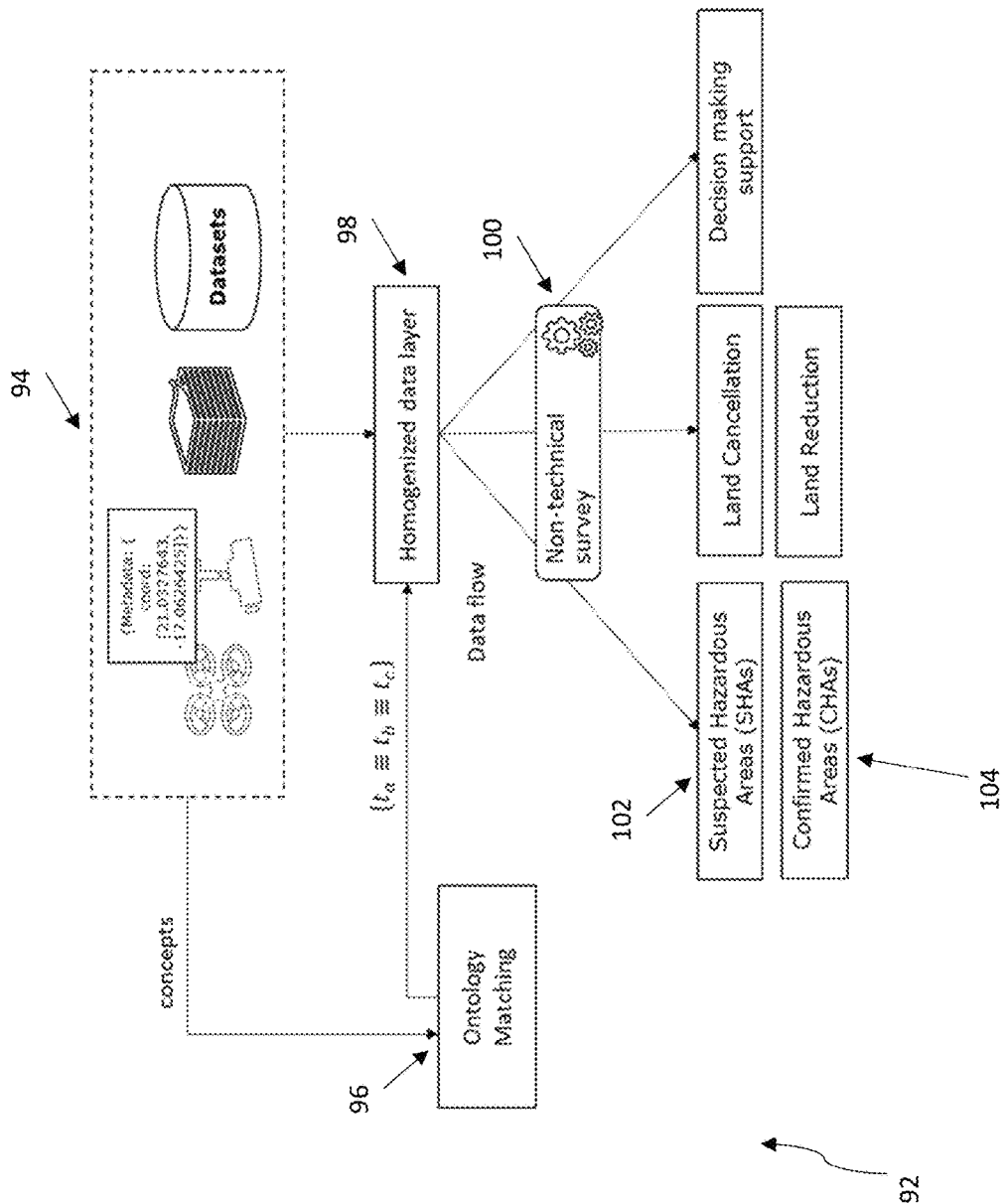
FIG. 9 illustrates an application of semantic concept matching according to an embodiment directed to a computerized humanitarian aid platform.

FIG. 9 discloses an embodiment of the present invention directed to a computerized Data Fabrics and Humanitarian Aid Platform 92. An example application is the weapon contamination and clearance for future humanitarian use such as accommodation or agriculture. For this technical application, various data sources currently exist where each data source maps to the same geographical region, but they follow different data models and formats.

TABLE 2

| Geographic item | Possible data types |
| --- | --- |
| Conflict area | Social media data, historical records/reports, regional profiles |
| Mine deployment strategy | Expert knowledge, virtual map |
| Weapons | Size/shape/IR profile, chemical content, explosive capability, UAV (unmanned aerial vehicle)/satellite img. |
| Vegetation | UAV image, satellite image |
| ... | ... |

Table 2 provides a list of some of the possible items that are from a geographic region and the possible data types for those items. Table 2 includes a few items as examples, while in practice there are many more items considered. Each of these possible data types have their own data models, formats, and in some cases the data source is represented by a specific ontology.

Although AI is used in certain data types, currently there are ad hoc AI applications on different data such as UAV (unmanned aerial vehicle) images from drones or survey data collected from the residents in the area. These ad hoc applications result in human effort at every step to understand and make a logical assessment.

In this embodiment, a data fabric is proposed which involves all available data sources in the common humanitarian aid platform. The common platform can be based on standard data models such as next generation service interfaces of linked data (NGSI-LD) data model and implemented using open-sources generic enablers of FIWARE (Future Internet WARE). A backbone ontology 96 is considered that binds together the existing data sources in the humanitarian aid platform to render a homogenized data layer 98. The backbone ontology 96 can be improved using the semantic concept matchings. For instance, whenever a new data source with a different ontology arrives, the system can automatically match the new semantic concepts to the existing ones, and for the ones that are not matched, it can extend the existing backbone ontology 96.

FIG. 9 illustrates the technological improvements of the application of semantic concept matching for the humanitarian aid platform 92, particularly for the weapon contamination use case. In this FIG. 9, various open datasets 94 (top), are matched together and used for a non-technical survey 100. Non-technical survey 100 consists of desk assessments, analysis of historical records, a wide range of information gathering and analysis functions, as well as physical visits to field locations. The Non-technical survey 100 allows confirming hazardous areas 104, suspected hazardous areas (SHAs) 102, and decision making. There are three technical challenges in this domain: 1) Mapping the heterogeneous data formats and models across fields/domains; 2) Manual effort to transform or map the data; and 3) Creating ad hoc data analytics results. Thanks to the semantic concept matching, the heterogeneous data formats and models can be mapped and the harmonized and organized data can be used as the digital twin. The platform can offer a standard interface such as NGSI-LD for accessing the needed data. Semantic concept matching helps automatically map the data sources to create the digital twin of the weapon contamination area in the humanitarian aid platform.

The identification of a suspected hazardous area 102 might directly command a drone to remotely sense the SHA (e.g., through infrared camera, or Lidar), to assess it as a confirmed hazardous areas (CHA) 104. Having precise data helps to achieve more precise SHAs 102 identification, and, thus, better usage of drones battery and time.

Having all available data sources on the common platform through the semantic concept matching would enable humanitarian AI applications. For instance, a risk assessment tool using deep learning can be applied on all available heterogeneous data sources thanks to the semantic concept matching. On the other hand, the semantic concept matching should operate in a satisfactory quality of service. The proposed system would enable more extensive and accurate matching with reduced labeling effort.

Figure 10:
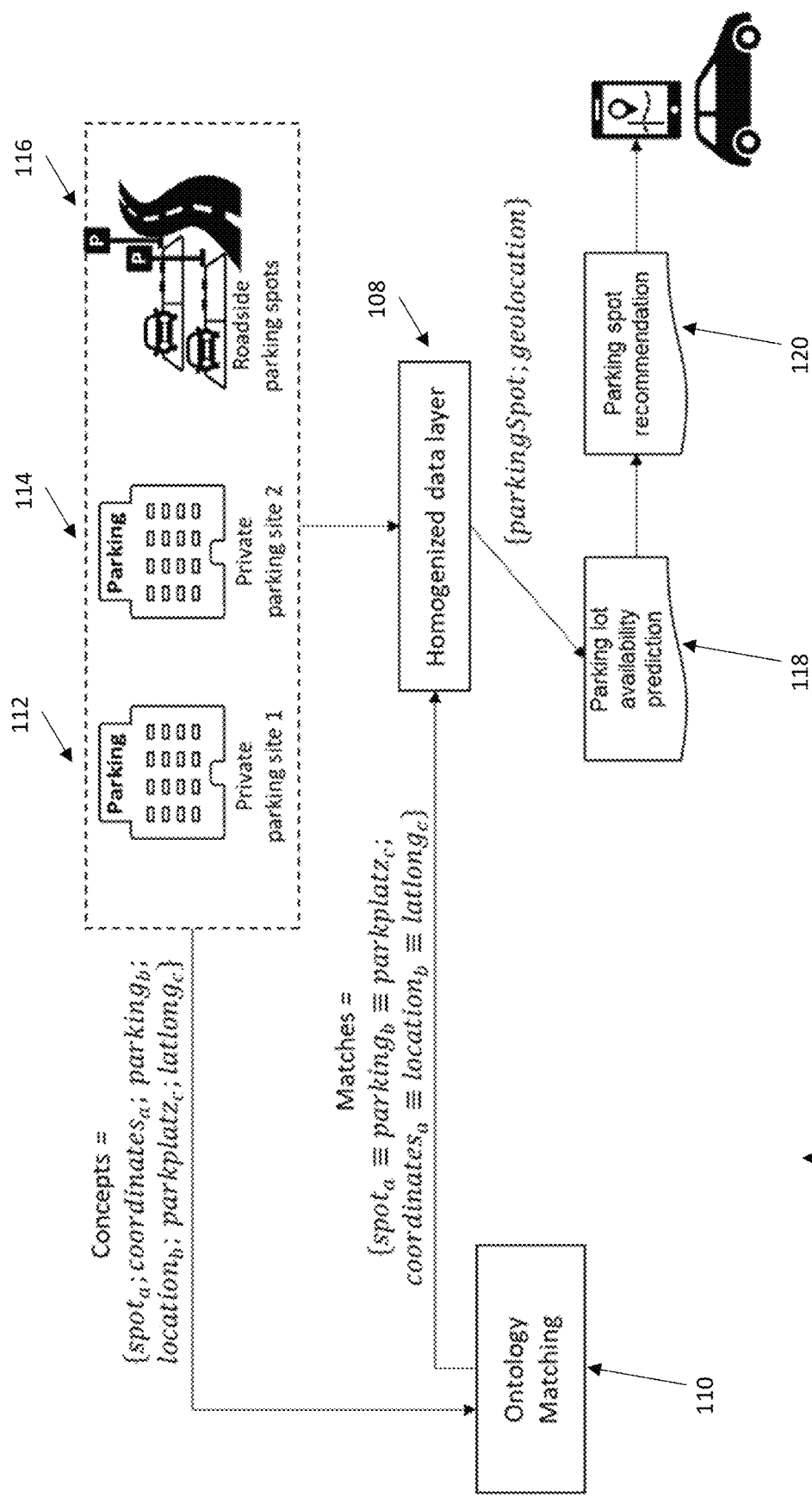
FIG. 10 illustrates an application of the semantic concept matching according to an embodiment directed to a smart parking system.

FIG. 10 discloses an embodiment of the present invention applied to smart mobility and smart parking, which are automated or semi-automated computer systems using mobility and parking networks. In urbanized environments the usage of private cars to move within the urban area brings many problems such as traffic congestion, road safety and air pollution. In congested cities, it is a challenge for a driver to find a parking spot at the end of its car trip. This causes waste of time for the driver, unnecessary occupation of roads causing more traffic congestion, unnecessary consumption of fuel causing pollution, and altogether reducing the liveability (defined as quality of life for inhabitants) of the city. Internet-of-Things (IoT) technologies help on digital transformation to have information of physical things available through API. IoT has been applied to smart mobility and smart parking. However, the service providers have always faced the issues of discovering the needed data from multiple sources and integrating the application logic with an available data source.

Having a homogenized data layer 108 with automatic ontology matching 110 would save the need for data integration and discovery, and it would offer more data for the application service.

FIG. 10 provides a smart city application scenario 106. There are two private parking sites, 112, 114, independent from each other and many roadside parking spots 116 managed by the city governance. Each private parking site 112, 114, 116 manages its own sensors deployment with data stored within its own premises with a data format and API of its choice. The city governance instead installed sensors under the road asphalt and collects the data through the IoT infrastructure of the city. The data is stored within cloud premises managed by the city governance.

Endpoints of the available data for all the three parking clusters (the two parking sites 112, 114 and the roadside parking spots 116) are publicly accessible. A service developer offering a parking spot recommendation 120 system would use the available data to infer parking lot availability 118 and use such data to steer the driver towards free parking spots and/or to make a parking spot recommendation 120. Having a homogenized data layer 108 that homogenizes the data from the different sources relieves the service developer from the data integration. Indeed, the homogenized data layer 108 would use the output of the ontology matching system 110 of an embodiment to semantically understand and link the available data. The smart parking application would need only to perform a single request to get the needed data.

In addition, if a new parking site, e.g. private parking site 3, exposes publicly its data with a new data format, the system automatically would homogenize the new available data and the smart parking application will use the new available data for better parking spot recommendation 120. The smart parking application would guide the car to a free parking spot, reducing air pollution, fuel consumption, road consumption, traffic congestion, and improving road security and city liveability.

Figure 11:
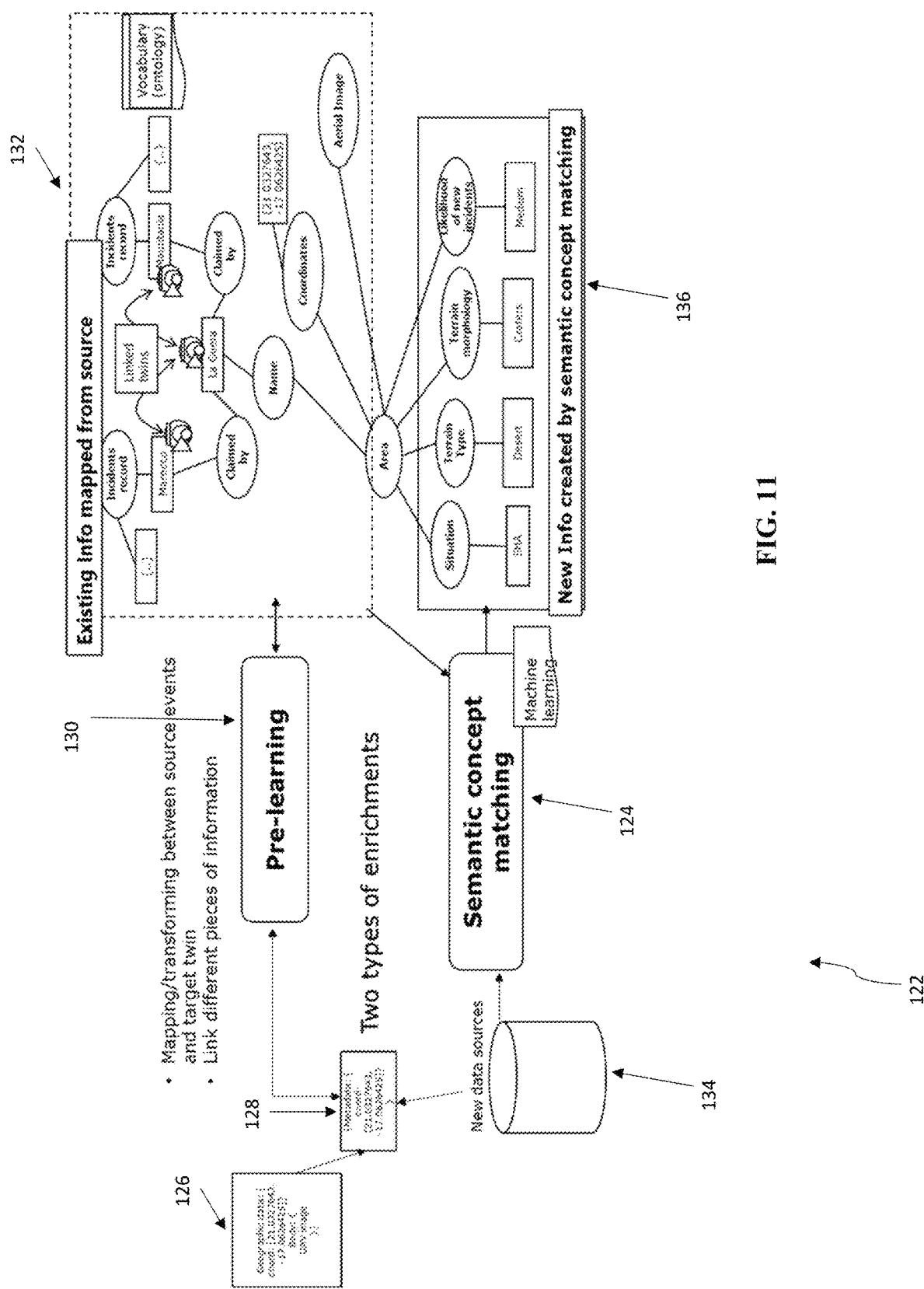
FIG. 11 illustrates an application of the semantic concept matching according to an embodiment for enriching a digital twin for smart cities.

FIG. 11 proves an embodiment applied to twin enrichment for smart cities 122. FIG. 11 illustrates how the semantic concept matching 124 can help enrich the digital twins for smart cities (urban digital twins). Considering an existing geographic data source 126 with known metadata 128, a pre-learning model 130 can parse the information data, for example by mapping/transforming between source events and a target twin, and link different pieces of information to source and create the "mapped data" 132 (top-right) from the existing data source. In addition to this pre-learning 130, new data sources 134 exist, where the data model is not well-known. To leverage the new data sources 134, semantic concept matching 124 through machine learning can automatically match the new information 136 created by semantic concept matching 124 of the new data source 134 to the existing mapping 132. For the new concepts in the new data sources 134, the semantic concept matching 124 can result in a non-match, which can be added to the existing information mapping 132 as the "new information" 136 (bottom-right).

Considering many heterogeneous data sources in a smart city (sensors, existing historical incidents record, existing ontology, terrain information, dynamically happening situations, new incidents), and new data sources 134 dynamically brought to the system, semantic concept matching 124 can help harmonize and organize these data sources in a linked-data format as shown in the FIG. 11. The first phase in this system with the pre-learning 130 is considered for "creating" the digital twin of the smart city. The second phase is considered for "enriching" the digital twin of the smart city. Semantic concept matching 124 is considered beneficial for the twin enrichment phase.

Figure 12:
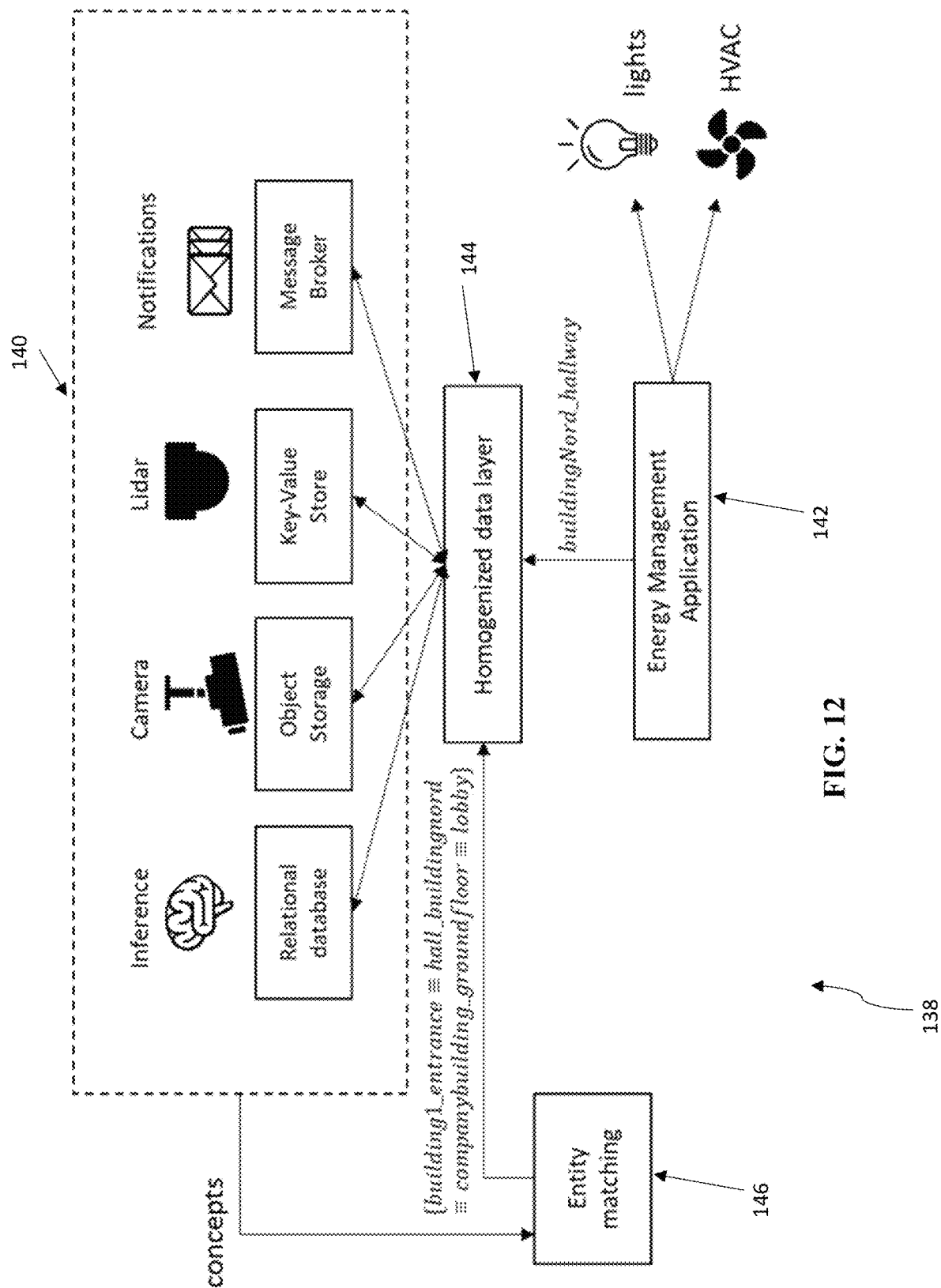
FIG. 12 illustrates an application of semantic concept matching according to an embodiment for a monitoring application for area management with multiple and heterogeneous data sources.

FIG. 12 provides an embodiment of the present invention applied to area management 138, where heterogeneous data sources 140 are deployed to monitor on real-time the status of an area (e.g., a building, a complex of business buildings) using an automated or semi-automated computer system. Data sources are handled by different data services. For example, camera images are handled by an object storage, point clouds coming from Lidar stored into a key-value store, inference from AI modules stored into a relation database, and high throughput notifications from sensors and mobile devices.

The data produced by different systems are modeled differently since the deployment of the data services happens at different times and different administrators manage them. Further, various service providers might develop and deploy AI module to produce inferences (e.g., crowd estimation based on Lidar, attire of the persons based on camera, or crowd mobility based on WiFi sniffers). Each inference system offers its own interface.

An energy management application 142 might use the awareness of area situations in order to command lights and HVAC systems. This intelligence might be based on current temperatures, forecasting of temperatures and weather, crowd estimation, attire of the present people, or gender and age of the present people.

In order for the energy management application 142 to optimally use all the needed data, the homogenized layer 144 might match concepts such as entities (the hall of a building), in order to offer a single interface with a homogenized entity naming. Bad performance of the entity matching module 146 results into silos of data not easily discoverable and accessible by data consumers, thus, hindering the homogenization of data. Embodiments of the present invention increase the entity matching 146 performance and thus increase the availability of data and, therefore, a more efficient energy management application 142.

Embodiments of the present invention provide improvements over other different & existing computer systems for concept matching. US 2008/0201280 A1 describes to check similarities between different patients and group them together. This is a rather straight-forward application of known ontology techniques into the health domain. KR 20110139681 A addresses a different problem of grouping one of more candidates for query optimization. US 2021/0201076 A1: describes a system that does not involve label augmentation or matching semantic bipairs (matching two pairs). Such a system could be improved by embodiments of the present invention. None of the three works above address application of labelling matrix reinforcement through matching semantic bipairs (two semantic concept pairs) or providing improved weak supervision. Nor do these works address augmenting labels using similarity scores or increasing the density of the matrix of noisy labels. Nor do these works address aggregating the similarity between two pairs of concepts or computing a single similarity score for each couple of pairs of concepts.

In US 2008/0201280 A1, a health record of one person is matched to the health record of another person, where each attribute (e.g., age, gender, etc.) can be similar or different. These similarities are aggregated such that the computation is performed for one pair of patients. In contrast, exemplary embodiments of the present invention can consider matching two pairs of semantic concepts based on their existing matchings (in both horizontal and vertical semantic concept matching) as opposed to matching only two concepts, and can compare the similarity-based matchings (not attributes).

KR 20110139681A is similar to the above case. There, the attributes of countries are considered to understand similarity of two countries and based on that make aspect-based queries. The method works on the attributes to decide on the distance (e.g., continents of two countries). Therefore, the method does not do similarity-based matching between two pairs.

Various embodiments of the present invention provide semantic concept matching system that leverages the similarity of semantic concept similarities for augmenting the existing labels from labeling functions. Various embodiments also provide the horizontal and vertical similarity of concept similarity computation using two semantic concept pairs, one of them already labeled. Embodiments further provide transferring the label from one pair to another.

An exemplary embodiment of the present invention provides a method for concept matching comprising the steps of:

1) Computing noisy labels by applying labeling functions for each pair of semantic concepts producing a labeling matrix;
2) Computing similarities using similarity metrics for each pair of concepts and optionally aggregate the similarities between two pairs of concepts to compute a single similarity score for each couple of pairs of concepts;

3) Augmenting labels using the similarity scores from step 2) to increase the density of the matrix of noisy labels;
4) Applying a label aggregator to decide on a single label per pair of concepts;
5) Training a discriminative machine learning model (end model); and
6) Using the trained discriminative model for matching semantic concepts.

Embodiments of the present invention, in contrast to existing technology, provide for the following improvements:

Reduced computational effort to implement and configure labeling functions for any new semantic concept matching problem.

Improved end accuracy, especially for the cases of missing anomaly detections (matchings). In the initial tests, embodiments of the proposed method and system produced up to 12 points improvement in the F1 scores.

Requiring fewer labeling functions than the existing Snorkel system based on the marginal max likelihood estimation method.

Improved accuracy based on a working prototype that was implemented on the ontologies from the area of conference events.

In the following, further background and description of exemplary embodiments of the present invention are provided in further detail. To the extent the terminology used to describe the following embodiments may differ from the terminology used to describe the preceding embodiments, a person having skill in the art would understand that certain terms correspond to one another in the different embodiments.

A technique to harmonize heterogeneous data models from different data sources is ontology matching. Different approaches have been proposed in this regard, including machine learning. Some works address ontology matching through weak supervision to avoid the process of hand-labeling huge datasets. An example is programmatic labeling where heuristics and rules, called labeling functions, generate noisy and incomplete labels. However, to cover a reasonable portion of the dataset programmatic labeling might require a significant number of LFs that might be time expensive to write and not always straight-forward. Exemplary embodiments of the present invention propose a novel system to augment labels for the ontology matching problem starting from outcomes of few LFs. Embodiments of the present invention may be based on the idea of similarity: given noisy labels yielded by a LF can be transferred to a similar abstained data point for the same LF. In this way, a wider portion of the dataset is covered even in the presence of a limited set of LFs. Experimentation results show that exemplary embodiments guarantee similar performances to state-of-the art data programming approaches when many labeling heuristics are used, while it provides significant improvements (up to 11 F1 points) when fewer LFs are available.

Ontology Matching aims to associate classes among different ontologies; in other words, a match is given by linking a concept a from a source ontology to another concept b of a target ontology, obtaining in this way an alignment.

Ontology matching is a key problem of IoT platforms as it plays a central role in creating a common knowledge base by combining heterogeneous IoT data sources together. Thus, solutions based on fully-supervised machine learning have been proposed. Alternatively, weak supervision through programmatic labeling using labeling functions is considered as a potential solution.

Weak supervision aims to solve problems introduced by the supervised approaches: supervised approaches require ground truth and consequently the involvement of domain experts to manually label each data point. This process is very costly for large and complex ontologies. Thus, WS copes with noisy data sources for labeling over more accurate hand-labels. Data programming that relies on noisy labels yielded by heuristics and rules called labeling functions provides examples of WS. Each LF is applied to every data point issuing a label or an abstain (if the condition statement of the rule does not apply). The resulting labeling matrix, which is formed by the labels per data point (represented by the rows) ordered by the LFs (represented by the columns), is processed by a labels aggregator that decides a single label per data point. The computed labels are, then, used to train a supervised ML model.

Ontology matching is modeled as a binary classification problem where a data point represents a relation between two concepts a and b of (possibly) two different ontologies. The relation might be a match if the two concepts match, or non-match otherwise.

Data programming approaches may assume that the set of LFs produces a labeling matrix that has a satisfactory density of labels. In other words the LFs should label a large portion of the dataset, possibly redundantly. However, writing a labeling function can be time expensive and it might require a domain expert (e.g., someone knowledgeable of natural language processing (NLP)).

The present invention applies a new approach of programmatic labeling, named generative weak supervision, to the ontology matching problem. The GenWS approach is more robust to data programming with respect to the number of LFs, since it augments the labeling matrix produced by LFs in order to increase its labels density. The augmentation method, named gravitation method, that implements the GenWS approach relies on the distances between data points based on their features. Exemplary embodiments have adapted this method for the ontology matching where a data point represents the relation of a concept pair. Exemplary embodiments adopt the idea of similarity between two relations of two concepts pairs (e.g., similarity between relation (a, b) and relation (a, c)). For this purpose, similarity metrics between the two concepts a 166 and b 168 of the relation are first computed and represented as data point $x^{(i)}$ 170 (see FIG. 14), and, then, overall similarity between the similarity metrics arrays of two relations of two concept pairs is computed.

Figure 14:
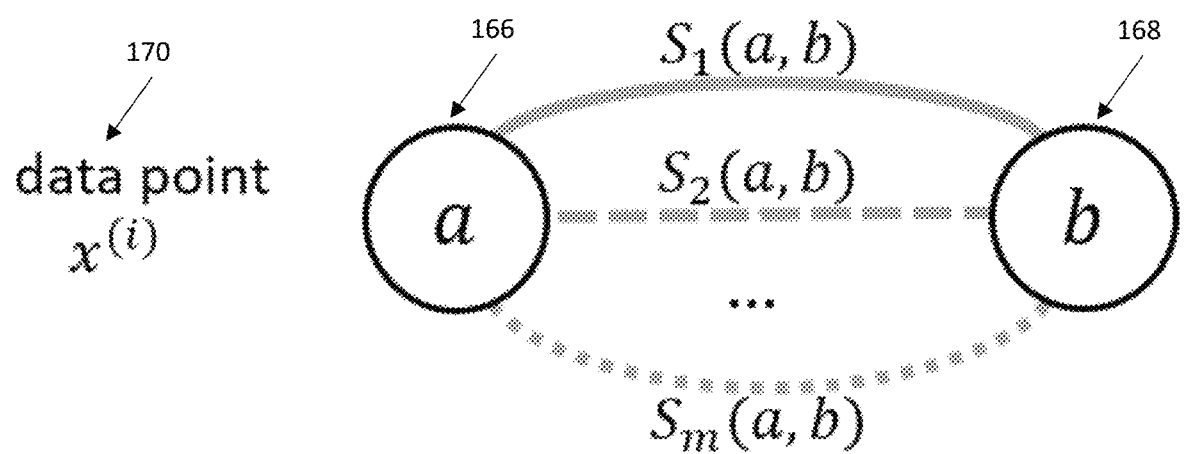
FIG. 14 illustrates an exemplary embodiment for computing similarity metrics between two concepts of a relation.

FIG. 14 shows the similarity between two classes a 166 and b 168 that belong to two different ontologies. The similarity is defined through a set of similarity metrics S1 (a, b), S2 (a, b), . . . , Sm (a, b).

Figure 13:
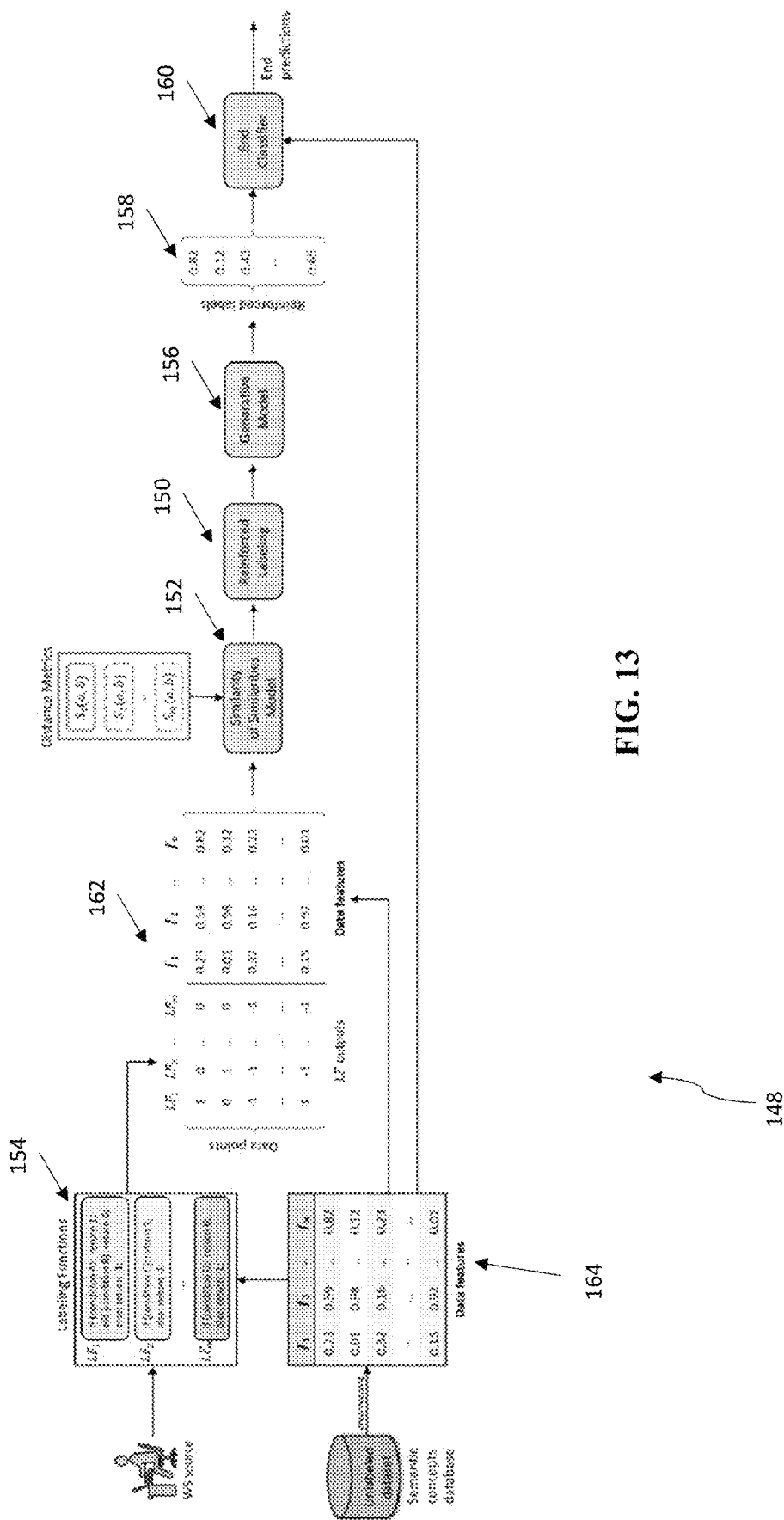
FIG. 13 illustrates an overall architecture of an exemplary system utilizing a similarity of similarities.

FIG. 13 shows the overall architecture of an exemplary system 148. FIG. 13 includes a standard pipeline of data programming, plus a reinforced labeling component 150 used for augmentation, and a similarity of similarities block 152 is used to adapt this augmentation to ontology matching.

Embodiments were tested on a dataset composed of seven ontologies referring to a conference track. The results show that the approach according to the embodiments has similar performance of state of the art approaches in the presence of many LFs, while it improves the performances up to 11 F1 points when limiting the number of LFs.

Data programming relies on the application of Labeling Functions 154, LFs, to generate labels. A labeling function $LF_j$ takes the data point $x^{(i)}$ with data features 164 (shown in FIG. 13 with exemplary values), as input and outputs a label. This label has to be considered noisy and not of the same quality as a ground truth, because LFs usually have lower accuracy than hand-labeling. As a result labeling matrixes 162 are produced in which the element of index (i,j) is the label produced by the labeling function $LF_j$ for the data point $x^{(i)}$. A way to transform the ontology matching into a binary classification problem is to model a pair of concepts, classes a and b, as a data point and the label indicates a match (1) or non-match (0) between the two classes. Each LF applies its logic to every data point and yields either a label (0 or 1) or abstain (−1). A labels aggregator, such as a generative model 156, decides a single probabilistic reinforced label per row 158 (thus, per data point) of the labeling matrix 162. Finally, this set of probabilistic labels is used to train an end model, e.g., end classifier 160, that can be designed to generalize and predict new labels for unseen data points.

For an ontology matching problem, writing labeling functions is not always straightforward since it might require knowledge of graph reasoning or natural language processing. Therefore, to have a satisfactory set of LFs might be very time-consuming and costly. Exemplary embodiments aim to reduce the number of the needed LFs by reinforcing the generated labeling matrix 162 to increase the label density (see FIG. 13). The augmentation uses the gravitation method that implements the GenWS approach: every data point not labeled by a labeling function 154 $LF_j$ could get a label by checking the labels for similar data points yielded by LF; distance based on features represents similarity of data points. A gravitation effect is inversely proportional to the distance, and for each unlabeled data point a cumulative effect with all the other labeled data points discerns a possible new label in the labeling matrix.

Distances between data points are stored in a proper matrix. One objective of the present invention is to define a method to create this structure for the specific problem of the ontology matching. Thus, embodiments can use the reinforced labeling component 150 to augment the labeling matrix.

Overviews to the ontology matching problem and linked data alignment have been offered in the art, and it has been proposed to study the similarity between two entities. The art highlights the need of more similarities measures to ensure enough results' confidence. Thus, values of different similarities as string-based or dictionary-based ones have to be aggregated.

Supervised learning to match ontologies has been proposed in the art. Some endeavors focus on the decision tree algorithm, while others use a regression model that considers similarity metrics as features. Moreover, numerous neural networks that learn through supervised approaches were used in the early 2010s. Unfortunately almost all neural networks need numerous training data to find parameters for networks. Thus, semi-supervised learning has been considered in order to start from a small set of training examples. For instance, certain approaches start from a small set of validated matching pairs and exploit the dominant relations in the similarity space to enrich the set of positive training samples. Other approaches also explore the aggregation of similarities metrics in order to apply semi-supervision to ontology matching. An initial small annotated dataset is collected from humans and an evolutionary algorithm is used to create a model to aggregate the similarity metrics towards a final prediction.

Frameworks have been proposed that center on Snorkel or Trove, using weak supervision, and their objectives are to match ontologies through data programming. Exemplary embodiments of the present invention start from the existing state-of-the-art weak supervision and adapt the enhancement proposed in the specific problem of ontology matching. For this reason, other related works in the field of weak supervision have been considered.

Methods for new and cheaper ways to obtain labels over the conventional hand-labeling of supervised learning have been proposed. In particular, Data Programming is a weak supervision approach that allows the labeling of data points by writing heuristics called labeling functions. This can be accomplished thanks in part to the frameworks such as Snorkel. For example, Snorkel permits the application of LFs and to produce probabilistic labels from their outcomes. In other words, this allows the implementation of the pipeline proposed by Data Programming. Some approaches try to accomplish this process at industrial scale. Reinforced labeling aims, in part, to extend this pipeline in order to label more data points in the presence of a limited set of LFs.

Figure 15:
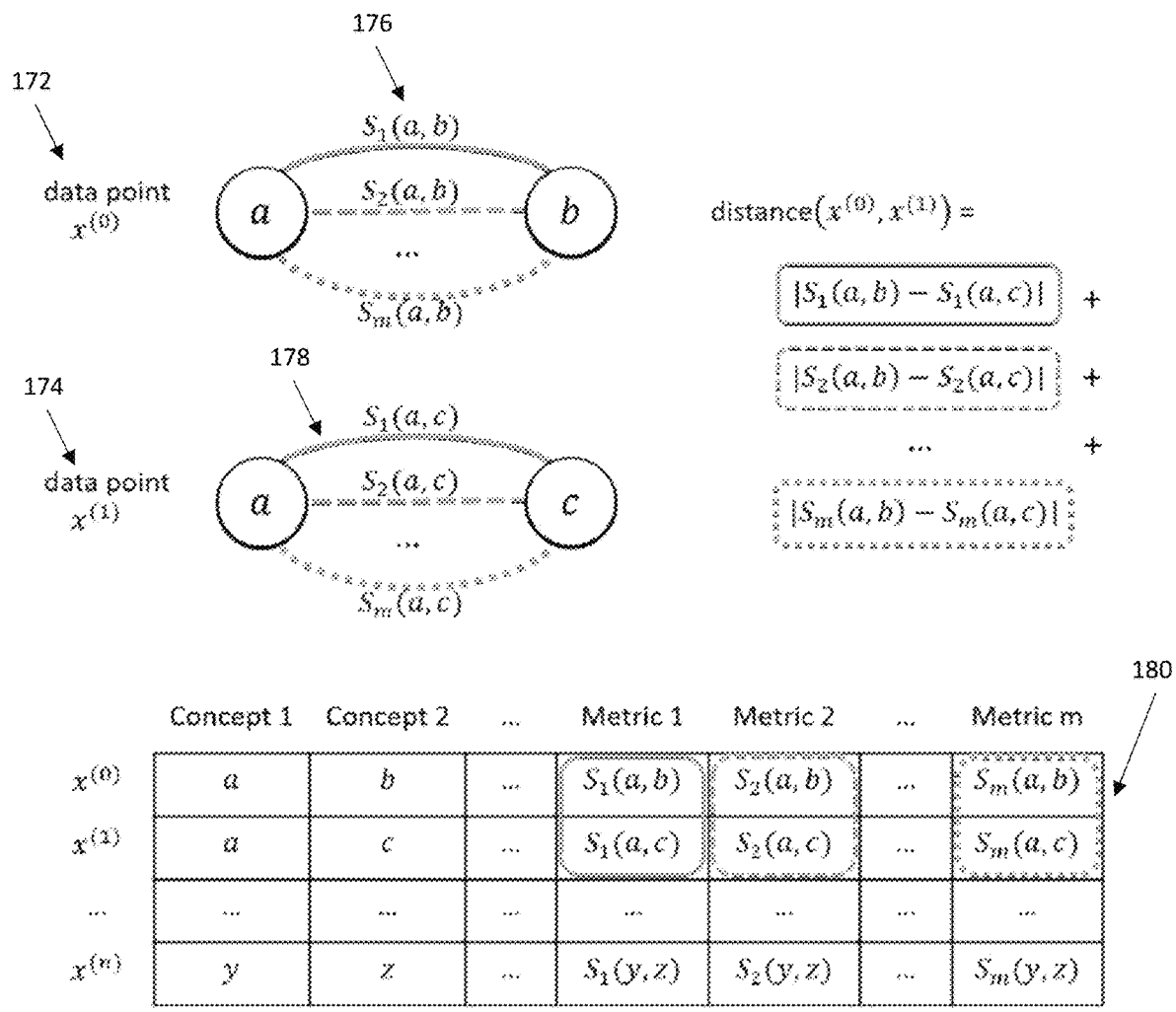
FIG. 15 illustrates data points of an embodiment of the similarity of similarities.

Embodiments of the present invention allow increasing the number of noisy labels from the generated labeling matrix and the data features of the data points, instead of writing new labeling functions. This augmentation process affects abstain values with labels. For this purpose, the GenWS method tries to diffuse the labels yielded by a LF to unlabeled data points that are similar to the labeled data points but that do not trigger the LF condition. FIG. 15 depicts the similarities between two data points $x^{(0)}$ 172, and $x^{(1)}$ 174 for an embodiment applying this method to the ontology matching, where a data point, e.g., $x^{(0)}$ 172 and $x^{(1)}$ 174, represents a relation between two concepts, such as a, b 176, and a, c 178.

FIG. 15 illustrates an embodiment of the similarity of similarities. As anticipated in FIG. 14, every concepts pair is characterized by a set of similarity metrics. These can be treated as features of the data points $x^{(0)}$ 172 and $x^{(1)}$ 174, as shown in the dataset 180 table of FIG. 15, where every metric is a column in the dataset. Data points with similar metrics are considered similar.

In an embodiment, the relation between concepts is first characterized through similarity metrics. To quantify how two concepts a and b are related, a set of metrics S1 (x,), S2 (x,), . . . , Sm(x,y) is defined. Each metric computes a different association between the two concepts; for example, a simple count of common characters between the concepts' names or a more complex function that involves natural language processing. Every metric is applied to every data point and normalized. Then, the similarity between two data points $x^{(0)}$ and $x^{(1)}$ (two concepts relations) is calculated in a form of distance ($x^{(0)}$, $x^{(1)}$), by adding the absolute number of differences of homologous similarities.

The computed distances are collected in a distance matrix where the element $x_{i,j}$ represents the distance between data point $x^{(i)}$ and data point $x^{(j)}$.

| Algorithm 1: dist_entityMatches(D) |
| --- |
| Input: D: Data Matrix containing for each row the combination of two concepts with their features; metrics |
| Output: distance_matrix: the final distances between all data points are stored here. They are used as metric of similarity. |
| 1  similarities ← { } |
| 2  $distance_{matrix}$ ← 0 * nxn |
| 3 |
| 4  # apply similarity metrics |
| 5  for $S_j$ ∈ metrics do |
| 6      $similarities_j$ ← { } |
| 7      for $x^{(i)}$ ∈ D do |
| 8          similarity ← $S_j(x^{(i)})$ |
| 9          $similarities_j$ ← $similarities_j$ ∪ similarity |
| 10     end |

| Algorithm 1: dist_entityMatches(D) |
|---|
| 11     similarities ← similiarities ∪ similarities$_j$ |
| 12 end |
| 13 |
| 14 # normalize per metric |
| 15 for similarities$_j$ ∈ similarities do |
| 16     similarities$_j$ ← normalize(similarities$_j$) |
| 17     # append the column of similarities to D |
| 18     D ← D ∪ similarities$_j$ |
| 19 end |
| 20 |
| 21 # compute similarity of similarities |
| 22 for $x^{(i)}$ ∈ D do |
| 23     for $x^{(k)}$ ∈ D do |
| 24         distance ← 0 |
| 25         for each metric j do |
| 26             d ← abs(similarities$_j$[i] − similarities$_j$[k]) |
| 27             distance ← distance + d |
| 28         end |
| 29         distance_matrix[i][k] ← distance |
| 30     end |
| 31 end |
| 32 return distance_matrix |

Algorithm 1, also shown in FIG. 16, is an exemplary pseudo-code of a present embodiment. First the metrics (line 5-12 of Algorithm 1) are applied and then a min-max normalization (line 15-19 of Algorithm 1). Given a pair of data points $x^{(i)}$ and $x^{(j)}$, the absolute value of the difference for every metric is added together (line 25-26 of Algorithm 1), and the final sum is stored in the distance matrix (line 28 of Algorithm 1).

In the embodiment of FIG. 13, the distance matrix is the input of the reinforcement labeling module that augments the labeling matrix. The present exemplary embodiment uses the gravitation method to augment the labels. This method considers the effects of labelled points as opposite effects (for binary classification problem) that tend to attract the unlabelled data points towards a class or another. When the sum of all the effects of a data point is bigger than a given threshold, such data point is labeled. An effect of a labeled data point $x^{(i)}$ on the unlabeled data point $x^{(j)}$ is inversely proportional to the distance between $x^{(i)}$ and $x^{(j)}$. The result will be the transition from a labeling matrix to a new one with less abstains. This new matrix will be the input of the labels aggregator that decides a single label per data point when possible. Various embodiments can implement the labels aggregator through, for example, a majority voter (wherein the label with the most appearances in the row is taken) or a generative model. The labels aggregator returns probabilistic labels. In other embodiments, the label aggregator may return a deterministic label, e.g., all of the data necessary to predict the label is possessed such that label to be applied is certain. A labeling matrix with more labels ensures that the labels aggregator has more confidence on the predicted labels, and, thus, a bigger set of labels with a certain confidence. This results in a bigger training dataset for the end classifier. Certain embodiments may decrease wrong label production by not introducing too much noise in the labeling matrix.

The present embodiment performs a method starting from the state-of-the art weak supervision approach. This initial weak supervision framework provides parsed datasets, ground truth, implemented labeling functions and an implemented data programming pipeline. Embodiments such as those of FIG. 13, can extend the weak supervision approach by applying the generative weak supervision. This section highlights the differences and the advantages of the two methods, testing different scenarios.

The method of an embodiment (referred to as "OntoAugment") can be tested on the same dataset composed of seven ontologies: cmt, confof, conference, edas, ekaw, iasted, sigkdd. An embodiment may use a total of eleven labeling functions, available from the weak supervision framework, but is not limited to any specific number of labeling functions. Ground truth is also available for the benchmark testing of weak supervision. The performance of the discriminative model can be considered both with and without blocking. Blocking is a process to roughly remove from a possible match pairs of concepts early on in the pipeline. In the present embodiment, blocking directly labels about 90% of the data points as a non-match. For both a non-blocking and blocking approach, the present embodiment may apply one form of the final class decision by considering a match only when confidence is the highest. A Random Forest classifier can be used as an exemplary discriminative model with 100 trees as number of estimators with a maximum depth of 4, number of jobs and random states equals to 1.

The present embodiment can have the metric set [$S_1$, $S_2$, ... $S_m$] consisting of:
1) levenshtein distance, which confronts two strings in terms of how many edits are needed to obtain a target string starting from a given one, e.g., an edit could be an insertion, a deletion, or a substitution;
2) spacy distance, which returns the SpaCy similarity between two class names; and
3) texts use distance, which first checks if the second elements of primary_texts_x and _y are greater than 2 in length, and at the same time if the first elements end with "_split". Next, it collects them in a list. For each element, texts use distance is equal to the numpy dot product divided by the product of their norms.

Exemplary embodiments may normalize these values obtained by these distances due to the different values ranges produced, such as [0, 94.0] for the levenshtein distance and [−1.0, 1.0] for the others. Other exemplary embodiments may have a metric set [$S_1$, $S_2$, ... $S_m$] comprising, in addition to levenshtein distance, spacy distance, and texts use distance:
1) token based similarities, which compares two strings by looking at units (tokens) of the strings (for example, words, n-grams, etc.), with algorithms that may resemble a cosine similarity;
2) sequence based, which compares two strings by looking at different subsequences of the strings;
3) phonetic, which compares two strings by comparing how they sound in pronunciation;
4) simple, which compares two strings by looking at some simple measurements of each string, such as prefix similarity, suffix similarity, length distance, and identity similarity; and
5) hybrid, which combines any of the above edit based approaches with any of the token based approaches.

In addition to the explicitly provided metrics and labeling functions, other labeling functions may be based on matching concepts' names, matching on roots of concepts' names, matching synonyms of concepts, and matching various classes of concepts, such as superclasses and subclasses.

In the present embodiment, named OntoAugment, the metrics used to evaluate the two approaches are accuracy, F1-score, precision, and recall. Since the ontology matching problem is extremely unbalanced (there are many more non-matches than matches), while the last three metrics are used to assess the results, and the accuracy is recorded for completion (a model simply predicting non-match will have always a very high accuracy). Table 3 shows that the present embodiment performs similarly to the weak supervision when all the available LFs are used, while it has better results in scenarios with less LFs.

TABLE 3

| Models/Metrics | All Labeling Functions (LFs) | | | |
|---|---|---|---|---|
| | acc | f1 | prec | rec |
| Weak supervision | 0.99 | 0.72 | 0.87 | 0.61 |
| Weak supervision-Blocking | 0.99 | 0.71 | 0.87 | 0.61 |
| OntoAugment | 0.98 | 0.70 | 0.74 | 0.66 |
| OntoAugment-Blocking | 0.98 | 0.68 | 0.73 | 0.64 |

| Models/Metrics | LFs − {$LF_6$, $LF_7$} | | | |
|---|---|---|---|---|
| | acc | f1 | prec | rec |
| Weak supervision | 0.97 | 0.52 | 0.45 | 0.61 |
| Weak supervision-Blocking | 0.96 | 0.49 | 0.43 | 0.56 |
| OntoAugment | 0.98 | 0.63 | 0.57 | 0.70 |
| OntoAugment-Blocking | 0.97 | 0.60 | 0.56 | 0.66 |

| Models/Metrics | LFs − {$LF_2$, $LF_6$, $LF_7$, $LF_{11}$} | | | |
|---|---|---|---|---|
| | acc | f1 | prec | rec |
| Weak supervision | 0.97 | 0.52 | 0.45 | 0.61 |
| Weak supervision-Blocking | 0.96 | 0.49 | 0.43 | 0.57 |
| OntoAugment | 0.97 | 0.59 | 0.52 | 0.69 |
| OntoAugment-Blocking | 0.97 | 0.57 | 0.50 | 0.66 |

| Models/Metrics | LFs − {$LF_1$, $LF_2$, $LF_3$, $LF_4$} | | | |
|---|---|---|---|---|
| | acc | f1 | prec | rec |
| Weak supervision | 0.98 | 0.68 | 0.87 | 0.56 |
| Weak supervision-Blocking | 0.98 | 0.68 | 0.87 | 0.56 |
| OntoAugment | 0.98 | 0.69 | 0.76 | 0.64 |
| OntoAugment-Blocking | 0.98 | 0.68 | 0.76 | 0.63 |

Table 3: In this table the results of various embodiments are presented, including the embodiment OntoAugment. Different scenarios are referred to with the corresponding number of labeling functions (LFs and other details are listed in FIG. 18 for the sake of completeness). In particular, four different embodiments are shown, starting from the whole set of LFs (All) and considering less LFs for the others which the excluded ones are listed after without.

Figure 17:
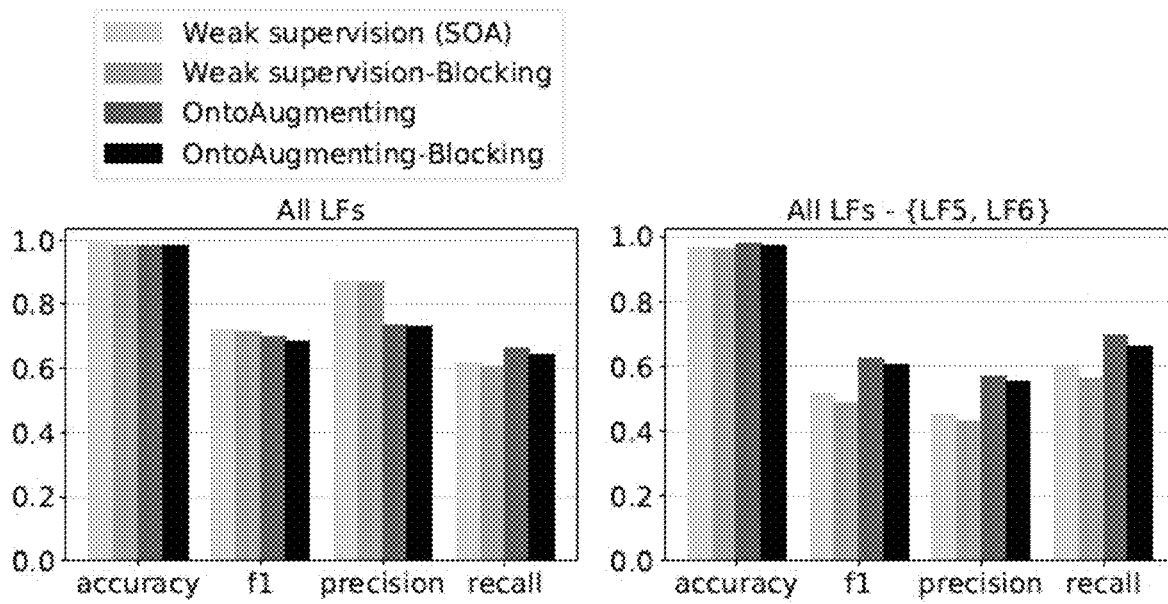
FIG. 17 illustrates a comparison of results of an Onto-Augment embodiment with and without blocking.

FIG. 17 illustrates a further comparison of results of an OntoAugment embodiment with and without blocking.

FIG. 18 provides further details of labeling functions used in the complete set scenario using all LFs. Outcomes were obtained by setting in an arbitrary way thresholds cited in "LF description" column, basing on the specific LF and on the size of the dataset.

In an exemplary embodiment when all the available LFs are used, the method slightly loses in F1 by dropping from 0.72 to 0.70. This can show that the dataset is already labeled enough (the labeling matrix is dense enough) and an embodiment using all available LFs is adding noise.

In an embodiment, then, the performance is tested while reducing the set of LFs. Those embodiments have: i) considered the set of LFs without $LF_6$ and $LF_7$; ii) the set of LFs without $LF_2$, $LF_6$, $LF_7$, $LF_{11}$; iii) the set of LFs without $LF_1$, $LF_2$, $LF_3$, $LF_4$. Some details related to the labeling functions used are shown in the table 3. The most pronounced improvement can see 11 F1 points, by raising from 0.52 to 0.63. It increases this way also because this time both precision and recall have an evident enhancement. This embodiment is obtained by excluding two of the most complex labeling functions. A qualitative distinction between simple and complex LFs can be done by considering their code size or the required knowledge to implement such LFs with natural language processing. Additionally, code size may indicate the complexity of the function, and more complex functions may be costlier or harder to implement. Other concerns may be that some LFs may be too noisy and may hurt the computation, which can indicate that in addition to exclusion, the LFs should not be implemented in the first place. A set of simple LFs is a plausible situation close to real cases, where few and immediate LFs are the first to be implemented over complex and time expensive ones.

Other embodiments were simulated by considering different subsets of the heuristics, and they output good results slightly shorter than the best ones that have been shown. The comparison of high scoring and low scoring embodiments are presented in FIG. 17.

Embodiments of the present invention can be performed on datasets, with a specific embodiment performed on a specific dataset of seven ontologies and through a set of eleven labeling functions. This dataset allows testing of the method, wherein the high unbalance of the dataset may result in a very small positive labels (only 259 matches on a total of 8630 data points). The present invention used this dataset for both the train set and test set in the discriminative model in the present embodiment, but the present invention also contemplates different datasets for training and testing.

Programmatic labeling is a weak supervision technique to noisy label data points through functions such as heuristics. This work focuses on applying the generative weak supervision technique, a programmatic labeling approach, to the ontology matching problem. In particular, an embodiment named OntoAugment is a method to apply the augmentation given by the reinforcement labeling of GenWS given the ontology matching dataset. OntoAugment relies on calculating the similarity between relation of concepts. These similarities are used to increase the number of noisy labels without the need to develop new LFs, with the final aim to have a bigger dataset for training a discriminative model. The present embodiment has been tested on a dataset composed of 7 ontologies and on different scenarios represented by different subset of the 11 available LFs. The results show that the augmentation provides at least similar performances in terms of F1-score when all the available LFs are used, while a notable improvement of 11 F1 points is also obtained in presence of less LFs.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for augmenting data labels of a machine learning task, the method comprising:
    applying at least one labeling function for each of a plurality of pairs of semantic concepts and producing a labeling matrix;
    computing pairwise similarity scores using similarity metrics for each of the pairs of semantic concepts;
    augmenting the labeling matrix using the pairwise similarity scores to increase a density of the labeling matrix; and
    inputting the labeling matrix to a label aggregator to apply a single label for each of the pairs of semantic concepts labeled by the at least one labeling function.

2. The method of claim 1, further comprising:
    computing a set of similarity scores between the pairwise similarity scores for each of the pairs of semantic concepts;
    computing a single similarity score between each two pairs of semantic concepts, using the set of similarity scores respective to each of the pairs of semantic concepts; and
    projecting a label from a labeled one of the semantic pairs to an unlabeled one of the semantic pairs in a case that the single similarity score is above a predetermined threshold.

3. The method of claim 1, further comprising training a discriminative machine learning model with the labeling matrix.

4. The method of claim 1, further comprising using a discriminative machine learning model that was trained with the labeling matrix to match semantic concepts.

5. The method of claim 1, wherein the pairs of semantic concepts comprise heterogeneous data sources of a geographical region and wherein the method further comprises identifying a hazardous area.

6. The method of claim 1, wherein the pairs of semantic concepts comprise data from independent parking spot providers, and wherein the method further comprises producing a homogenized data layer comprising parking spot availability information.

7. The method of claim 1, wherein the pairs of semantic concepts comprise data from an existing geographic data source with known metadata, and wherein the method further comprises:
    creating mapped data for a digital twin of a smart city;
    creating subsequent pairs of semantic concepts comprising new data sources;
    applying the at least one labeling function for the subsequent pairs of semantic concepts; and
    enriching the mapped data for the digital twin of the smart city using the subsequent pairs of semantic concepts.

8. The method of claim 1, wherein the pairs of semantic concepts comprise data from heterogeneous data sources of energy consuming systems in an area, and wherein the method further comprises producing a homogenized data layer queryable by an energy management application.

9. The method of claim 1, wherein:
    at least two labeling functions label a single pair of the pairs of semantic concepts;
    the label aggregator aggregates all labels applied to the single pair of semantic concepts; and
    the single pair of semantic concepts is labeled with the label applied most frequently to the single pair of semantic concepts.

10. The method of claim 1, wherein the at least one labeling function abstains from applying a label to a first pair of the semantic concepts, and applies a label to a second pair of the semantic concepts, and wherein the method further comprises:
    calculating a deterministic or probabilistic value using a distance between the first pair of semantic concepts and the second pair of semantic concepts; and
    labeling the first pair of semantic concepts using the deterministic or probabilistic value, based on the deterministic or probabilistic value being greater than a predetermined threshold.

11. The method of claim 1, wherein the set of similarity scores is a summation of a finite set of the pairwise similarities that is computable to a definite number.

12. The method of claim 1, wherein the label aggregator creates a training dataset for training a discriminative machine learning model.

13. The method of claim 1, wherein the step of computing similarity scores using similarity metrics for each of the pairs of semantic concepts further comprises:
    creating a first pair of semantic concepts from a first concept and a second concept;
    computing a first similarity score using the similarity metrics for the first pair of semantic concepts;
    creating a second pair of semantic concepts from a third concept and a fourth concept;
    computing a second similarity score using the similarity metrics for the second pair of semantic concepts;
    computing a third similarity score using the similarity metrics for the first concept of the first pair of semantic concepts and the third concept of the second pair of semantic concepts; and
    computing a fourth similarity score using the similarity metrics for the second concept of the first pair of semantic concepts and the fourth concept of the second pair of semantic concepts.

14. A system for augmenting data labels of a machine learning task comprising one or more hardware processors which, alone or in combination, are configured to provide for execution of the following steps:
    applying at least one labeling function for each of a plurality of pairs of semantic concepts and producing a labeling matrix;
    computing pairwise similarity scores using similarity metrics for each of the pairs of semantic concepts;
    augmenting the labeling matrix using the pairwise similarity scores to increase a density of the labeling matrix; and
    inputting the labeling matrix to a label aggregator to apply a single label for each of the pairs of semantic concepts labeled by the at least one labeling function.

15. A tangible, non-transitory computer-readable medium having instructions thereon which, upon being executed by one or more hardware processors, alone or in combination, provide for execution of the following steps:

applying at least one labeling function for each of a plurality of pairs of semantic concepts and producing a labeling matrix;
computing pairwise similarity scores using similarity metrics for each of the pairs of semantic concepts;
augmenting the labeling matrix using the pairwise similarity scores to increase a density of the labeling matrix; and
inputting the labeling matrix to a label aggregator to apply a single label for each of the pairs of semantic concepts labeled by the at least one labeling function.

* * * * *